(12) United States Patent
Ryu et al.

(10) Patent No.: US 10,595,188 B2
(45) Date of Patent: Mar. 17, 2020

(54) METHOD FOR GROUP MESSAGE TRANSMISSION IN WIRELESS COMMUNICATION SYSTEM AND APPARATUS THEREFOR

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Taehun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 15/741,110

(22) PCT Filed: Jun. 30, 2016

(86) PCT No.: PCT/KR2016/007073
§ 371 (c)(1),
(2) Date: Dec. 29, 2017

(87) PCT Pub. No.: WO2017/003235
PCT Pub. Date: Jan. 5, 2017

(65) Prior Publication Data
US 2018/0352416 A1    Dec. 6, 2018

Related U.S. Application Data

(60) Provisional application No. 62/186,385, filed on Jun. 30, 2015.

(51) Int. Cl.
*H04W 8/02* (2009.01)
*H04W 4/08* (2009.01)
(Continued)

(52) U.S. Cl.
CPC ............... *H04W 8/02* (2013.01); *H04W 4/08* (2013.01); *H04W 4/70* (2018.02); *H04W 76/28* (2018.02);
(Continued)

(58) Field of Classification Search
CPC ..... H04W 8/02; H04W 8/186; H04W 68/005; H04W 68/025; H04W 76/28;
(Continued)

(56) References Cited

U.S. PATENT DOCUMENTS

2012/0106431 A1*  5/2012 Wu ........................ H04W 4/00
                                                              370/312
2014/0011505 A1   1/2014 Liao
(Continued)

FOREIGN PATENT DOCUMENTS

WO   WO 2011/099821 A2    8/2011
WO   WO-2011099821 A2 *   8/2011 ............. H04L 51/38
(Continued)

*Primary Examiner* — George Eng
*Assistant Examiner* — Hung K Du
(74) *Attorney, Agent, or Firm* — Birch, Stewart, Kolasch & Birch, LLP

(57) ABSTRACT

A method for transmitting, by a first mobility management entity (MME), a group message in group units, to which a plurality of terminals belong, in a wireless communication system according to one embodiment of the present invention may comprise the steps of: receiving a group message request message requesting for transmission of the group message, wherein the group message request message includes a group identifier (ID) of a group to receive the group message, delivery contents to be transmitted to the group, and validity time which buffers the delivery contents; detecting a first terminal connected to the first MME within the validity time; confirming whether the group ID of the detected first terminal is identical to the group ID of the group message request message; and, if the two group IDs
(Continued)

are identical, transmitting the delivery contents to the first terminal.

14 Claims, 20 Drawing Sheets

(51) Int. Cl.
    *H04W 76/40*     (2018.01)
    *H04W 4/70*     (2018.01)
    *H04W 76/28*     (2018.01)
    *H04W 8/18*     (2009.01)
    *H04W 68/00*     (2009.01)
    *H04W 88/02*     (2009.01)

(52) U.S. Cl.
    CPC ............ *H04W 76/40* (2018.02); *H04W 8/186* (2013.01); *H04W 68/005* (2013.01); *H04W 88/02* (2013.01)

(58) Field of Classification Search
    CPC ......... H04W 76/40; H04W 4/70; H04W 4/08; H04W 4/06; H04W 88/02
    See application file for complete search history.

(56) References Cited

U.S. PATENT DOCUMENTS

| | | | |
|---|---|---|---|
| 2014/0112251 A1* | 4/2014 | Kim | H04W 4/70 370/328 |
| 2016/0007138 A1* | 1/2016 | Palanisamy | H04W 4/70 455/41.2 |
| 2017/0215169 A1* | 7/2017 | Lee | H04W 68/02 |

FOREIGN PATENT DOCUMENTS

| | | |
|---|---|---|
| WO | WO 2012/124904 A2 | 9/2012 |
| WO | WO 2014/027740 A1 | 2/2014 |
| WO | WO 2014/046686 A1 | 3/2014 |

* cited by examiner

[FIG. 1]
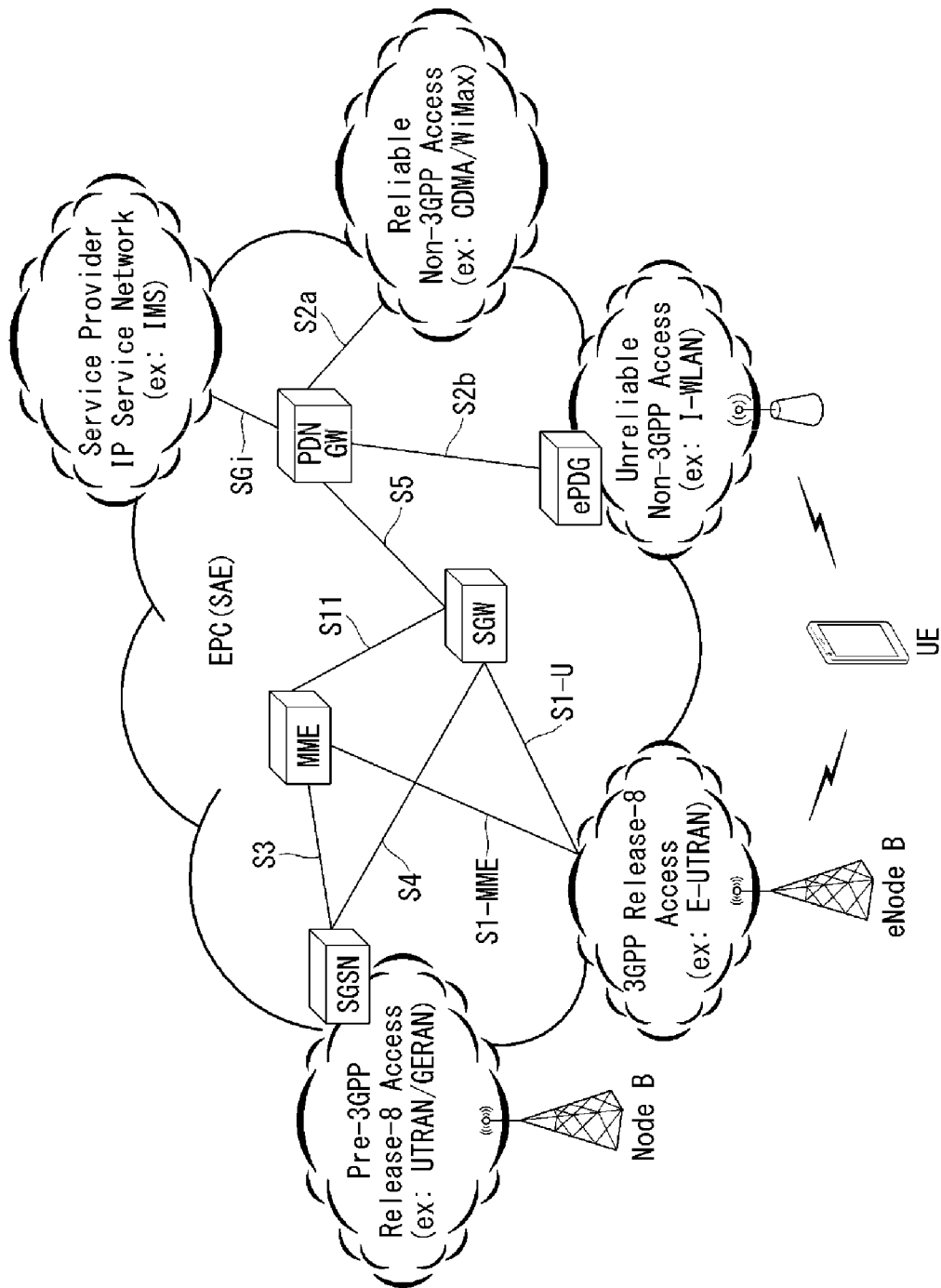

[FIG. 2]
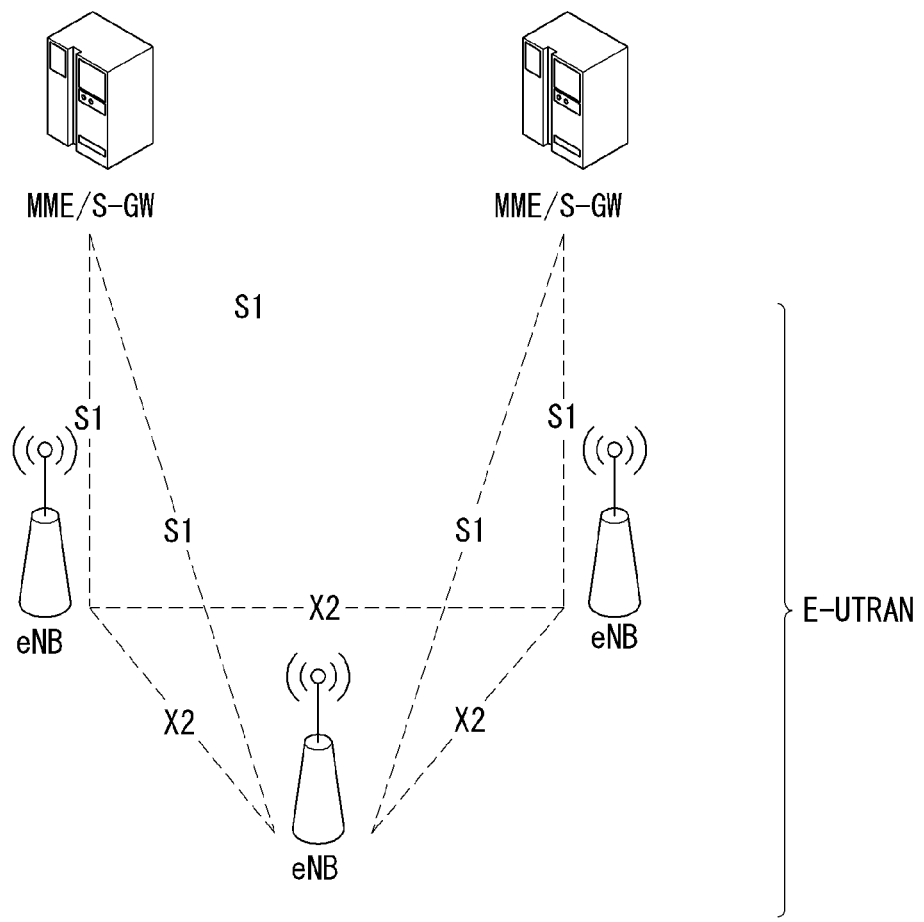

[FIG. 3]
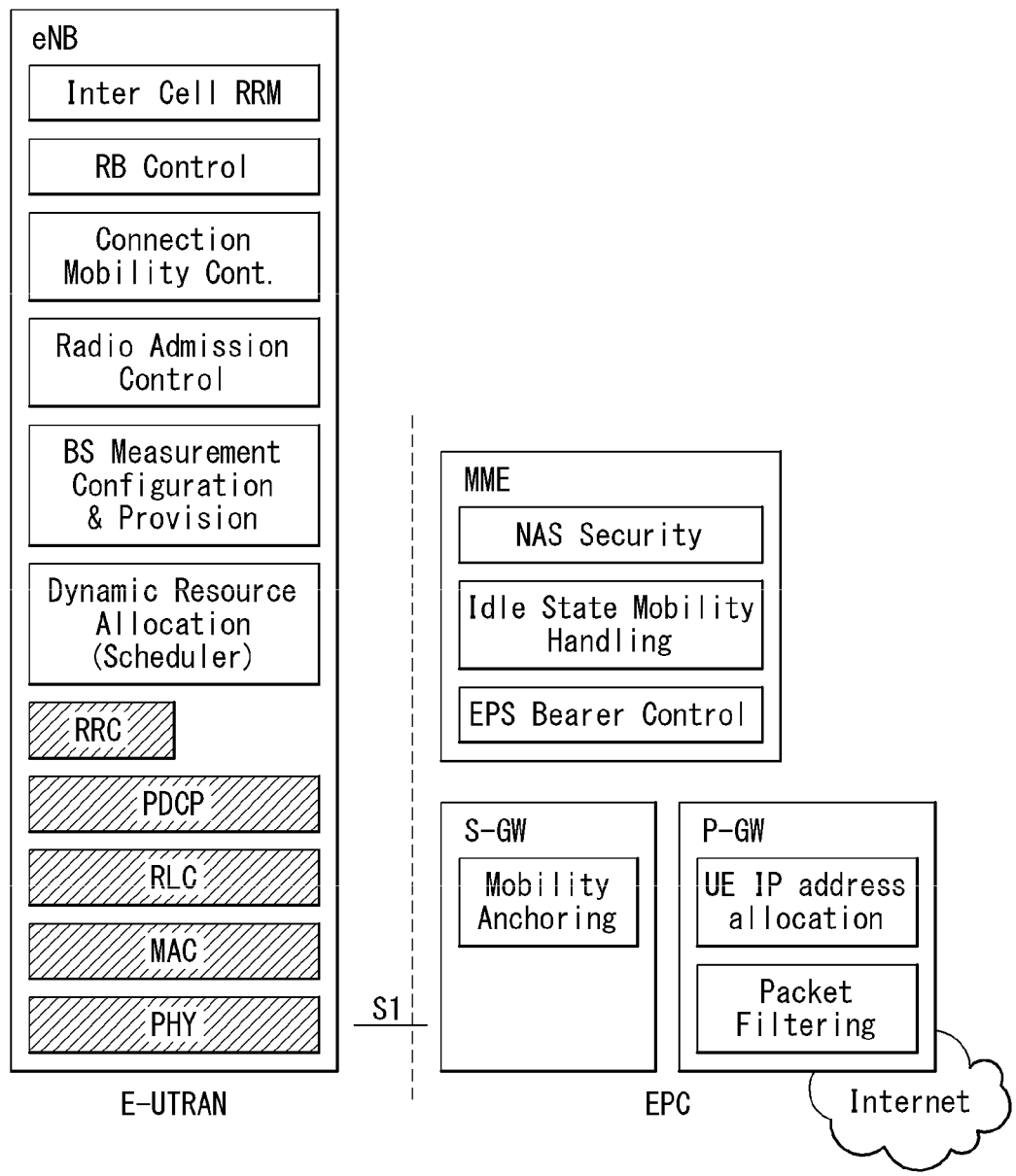

[FIG. 4]
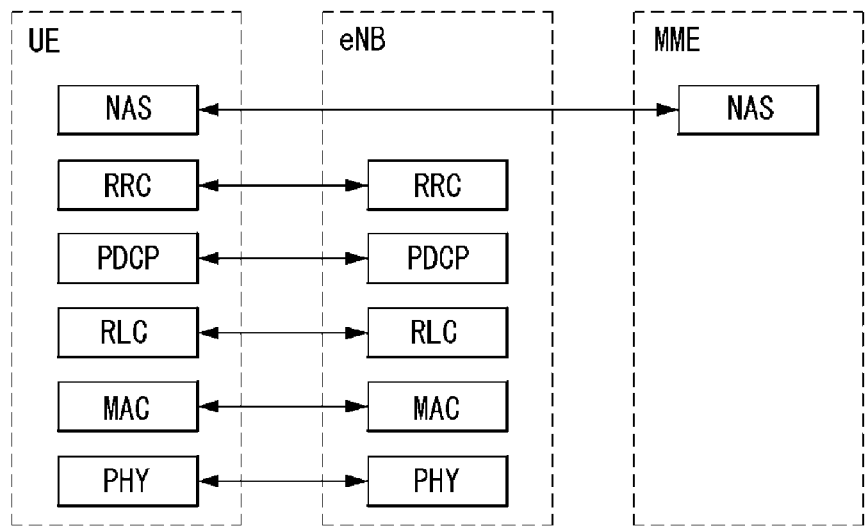
(a) Control Plane Protocol Stack
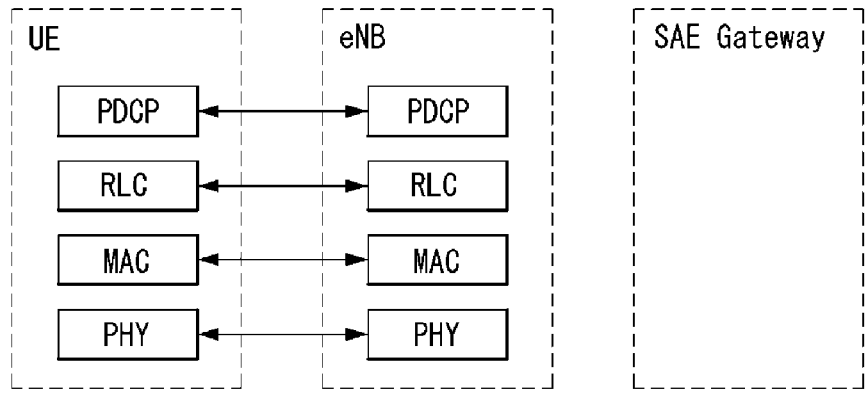
(b) User Plane Protocol Stack

[FIG. 5]
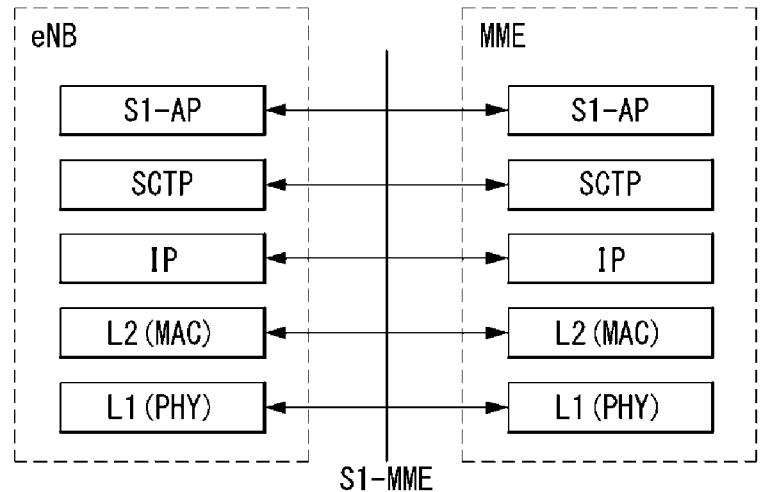
(a) control-plane protocol stack
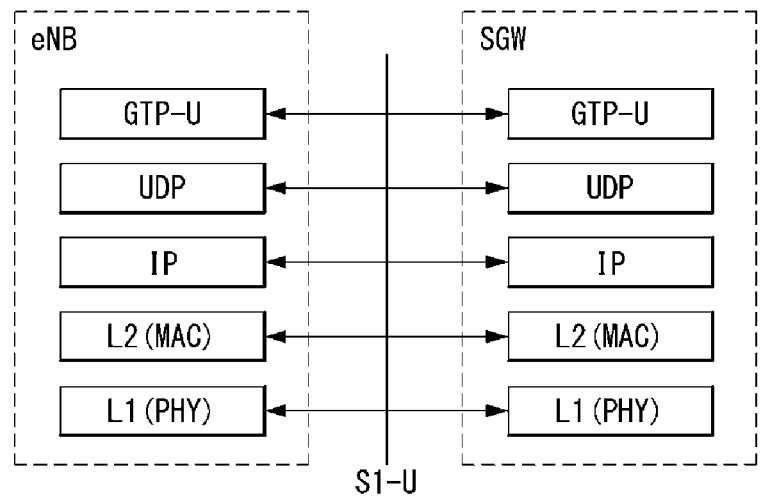
(b) user-plane protocol stack

[FIG. 6]
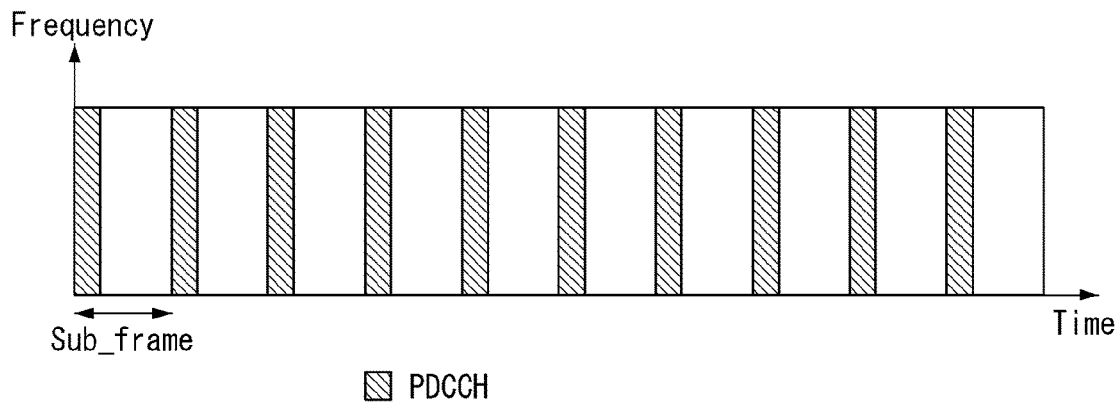
[FIG. 7]
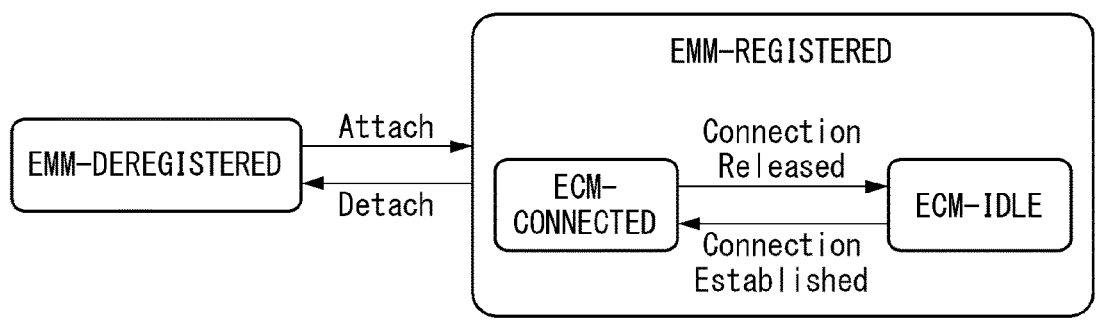
[FIG. 8]
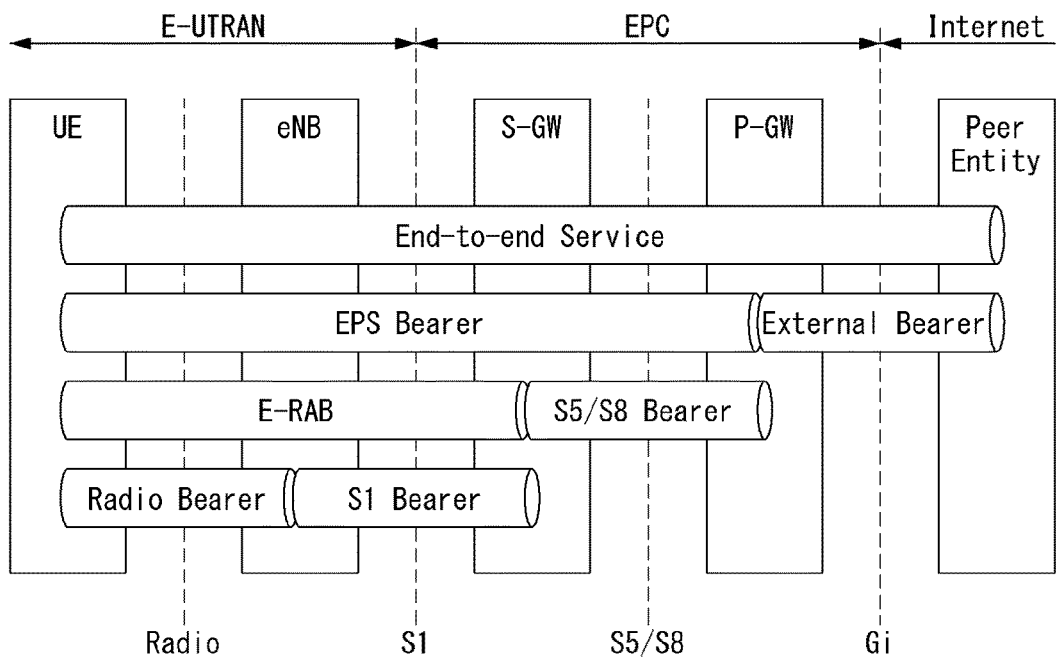

[FIG. 9]
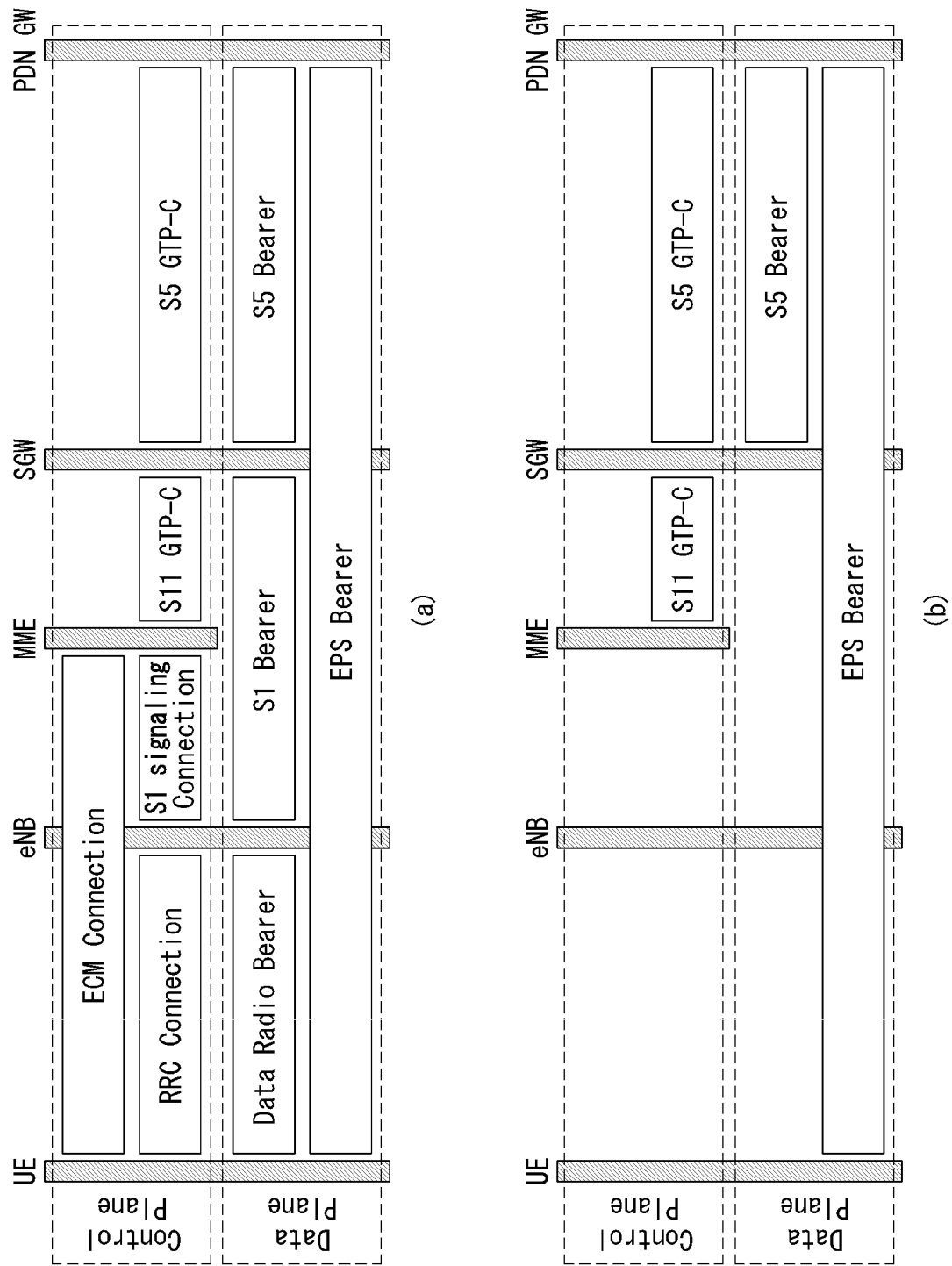

[FIG. 10]
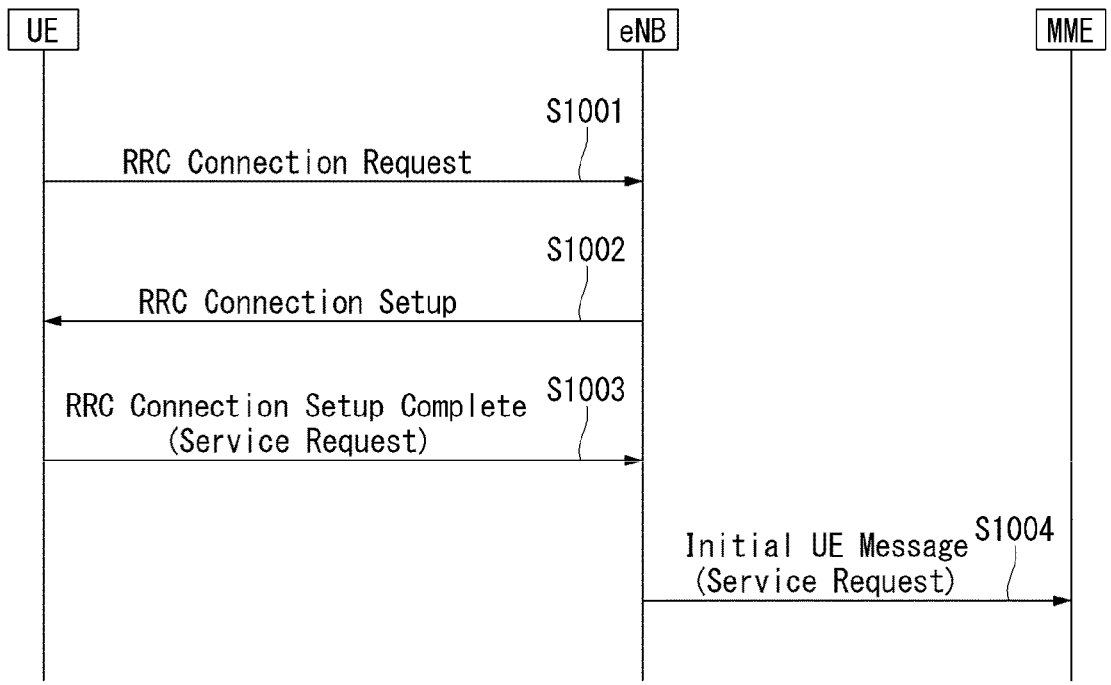
[FIG. 11]
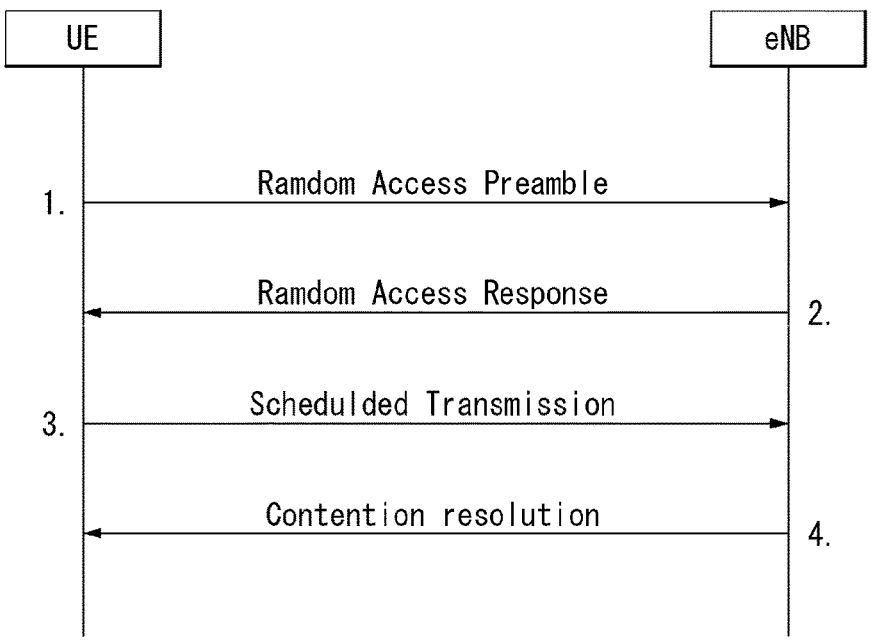

[FIG. 12]
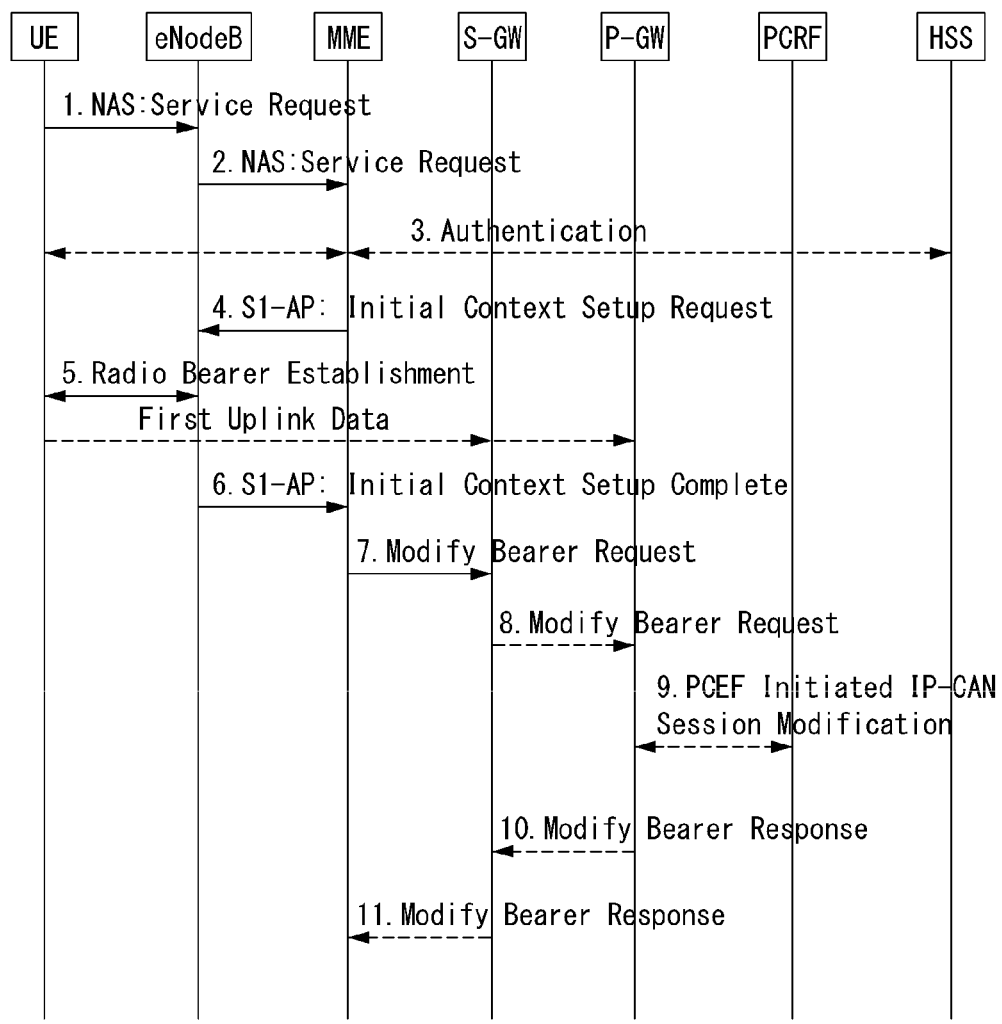

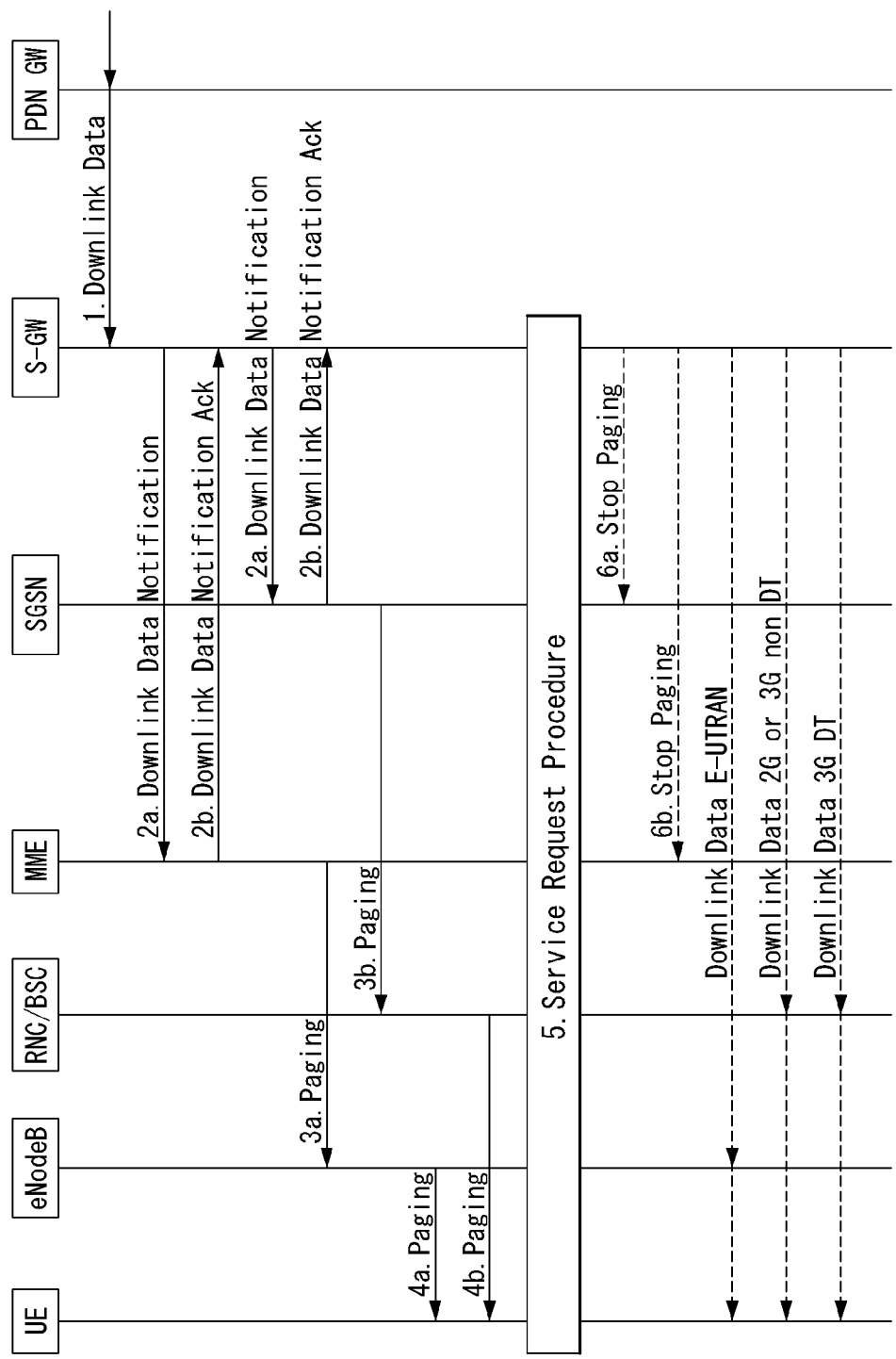
[FIG. 13]

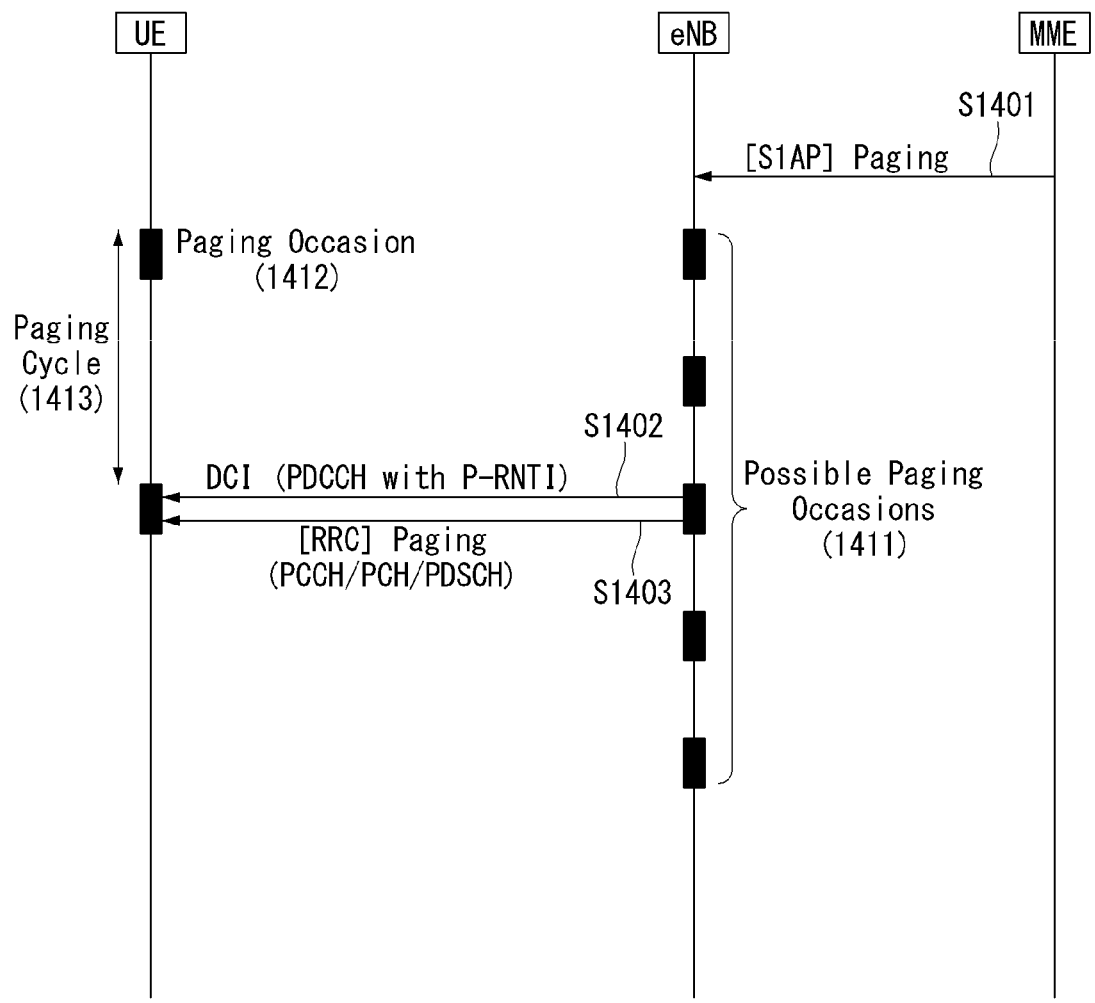
[FIG. 14]

[FIG. 15]
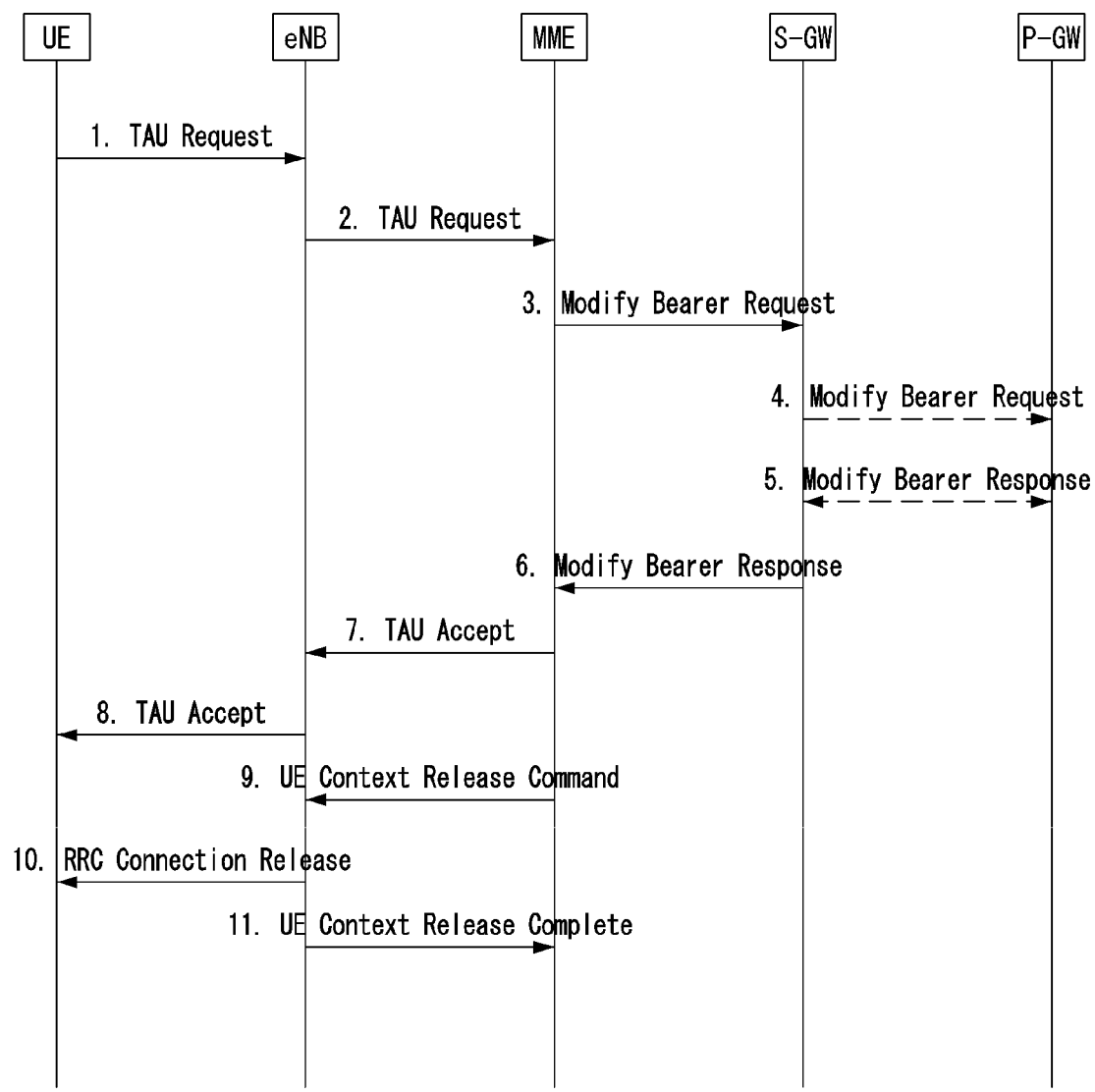

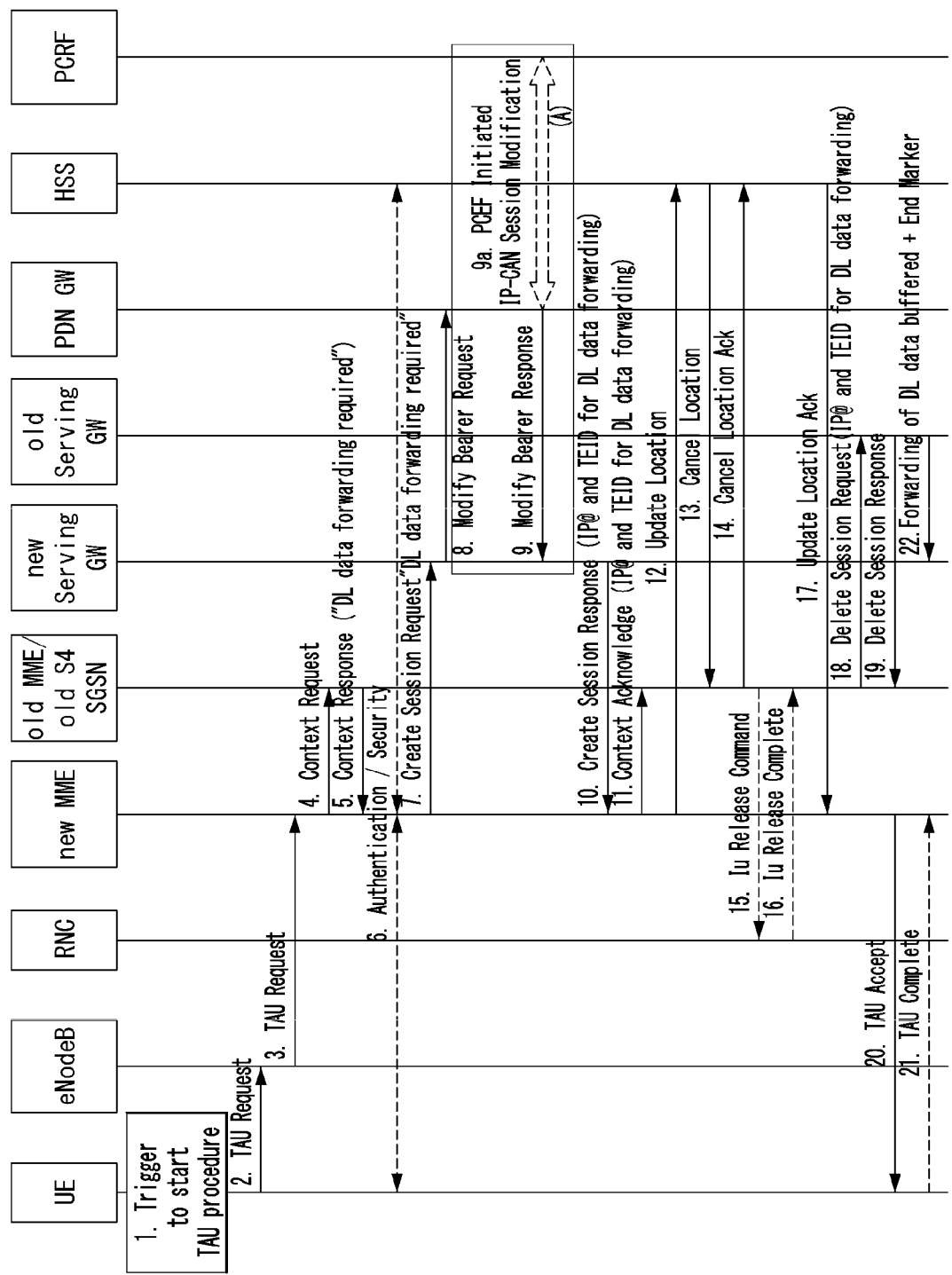
[FIG. 16]

【FIG. 17】
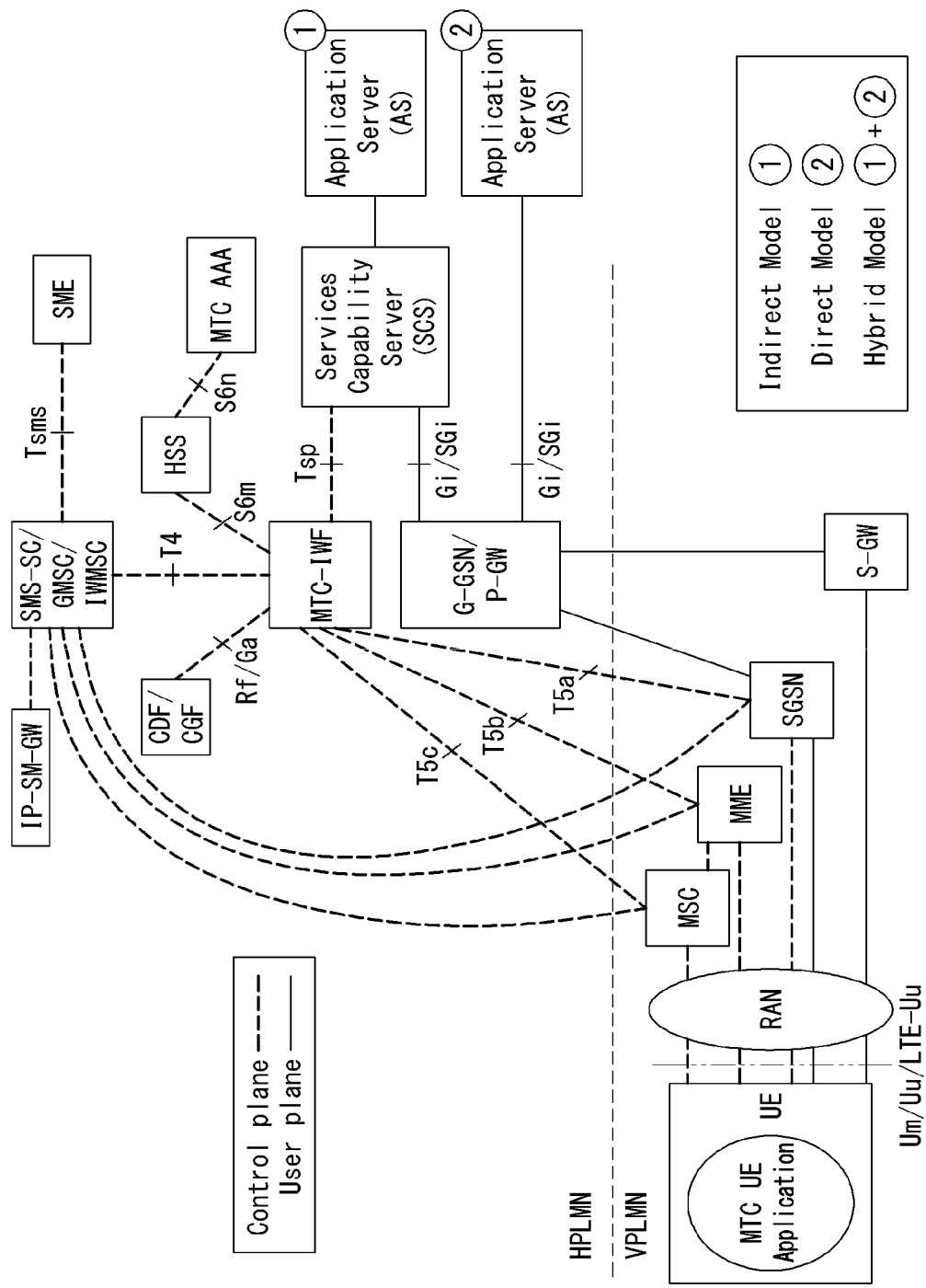

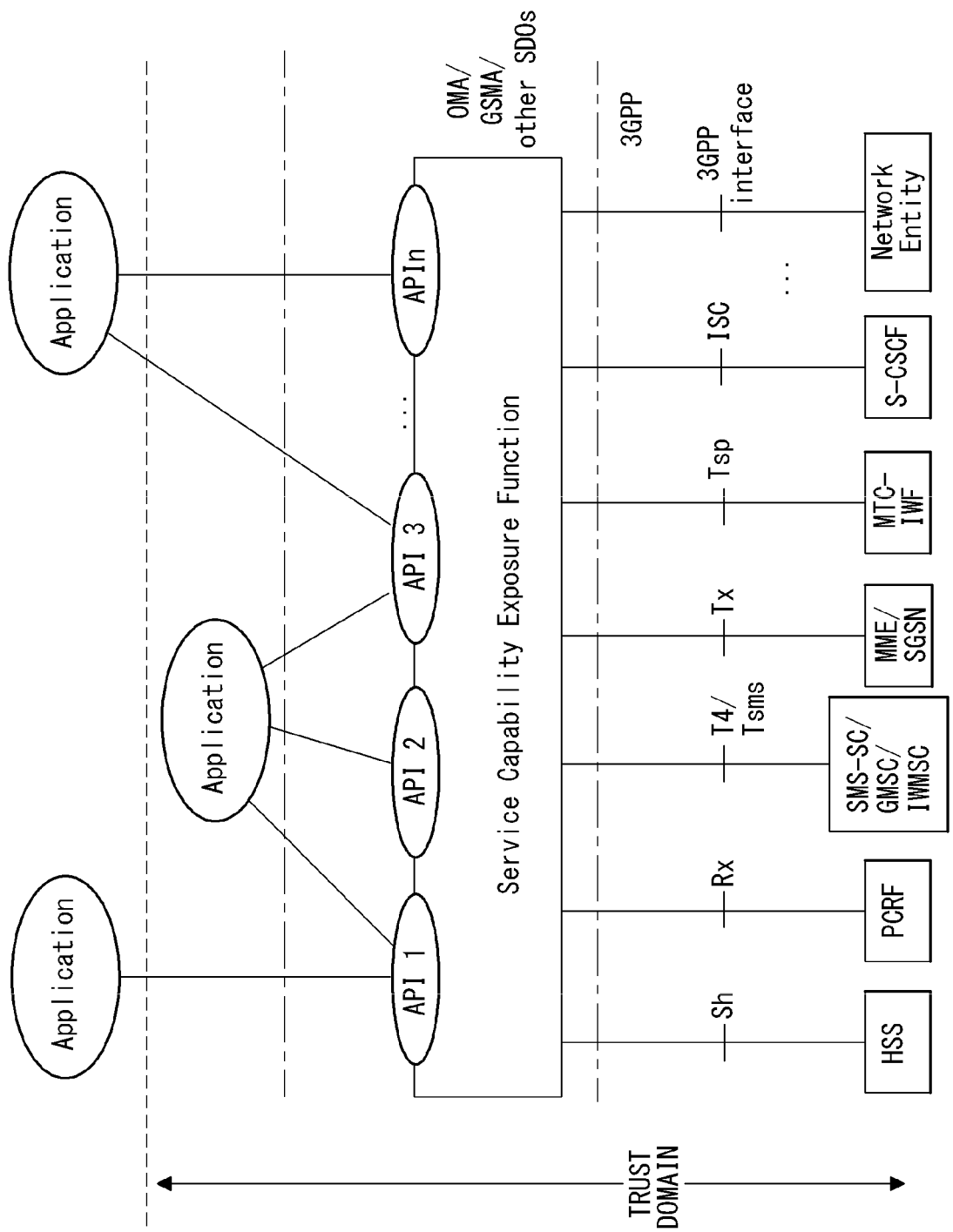
[FIG. 18]

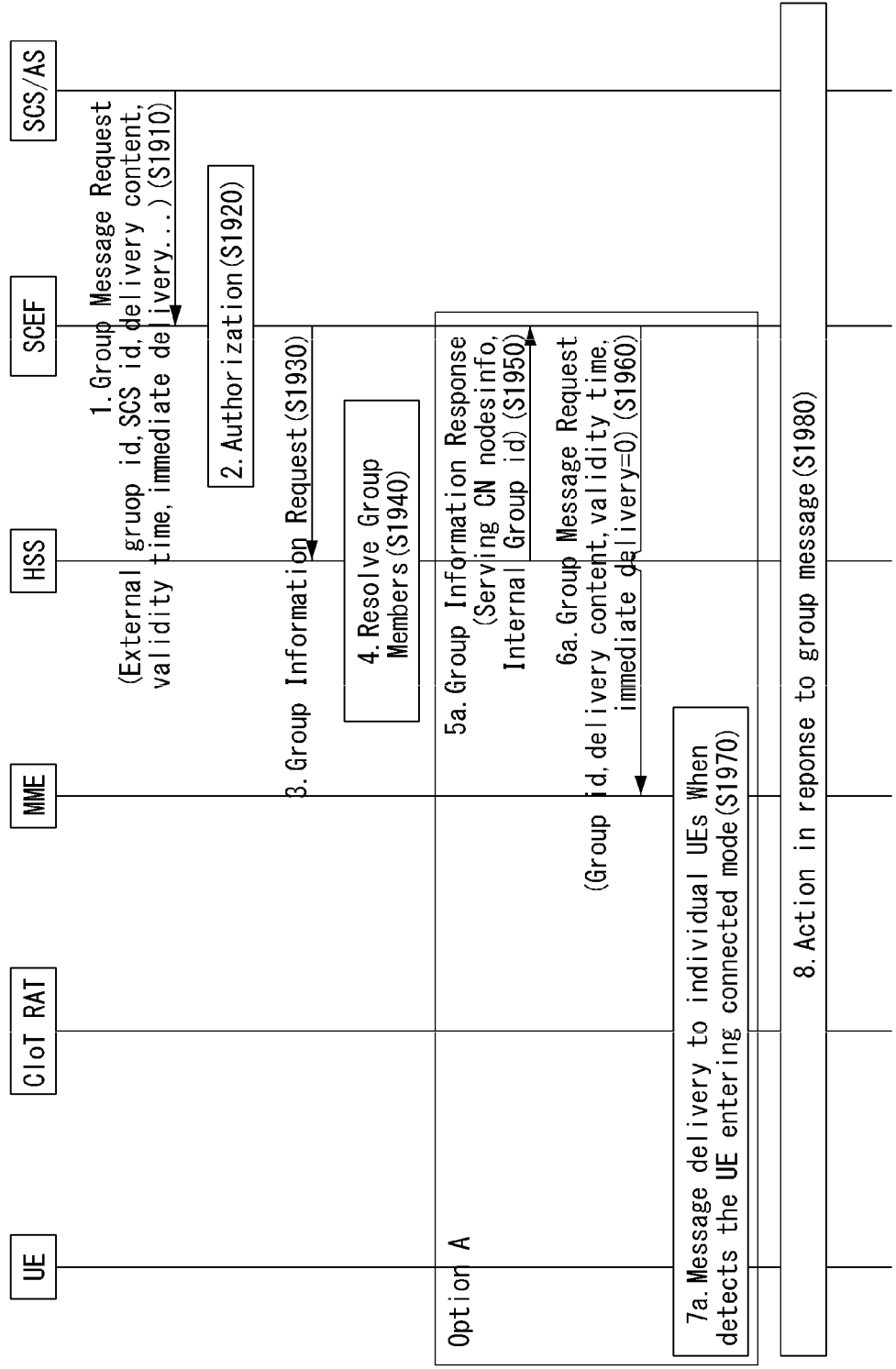

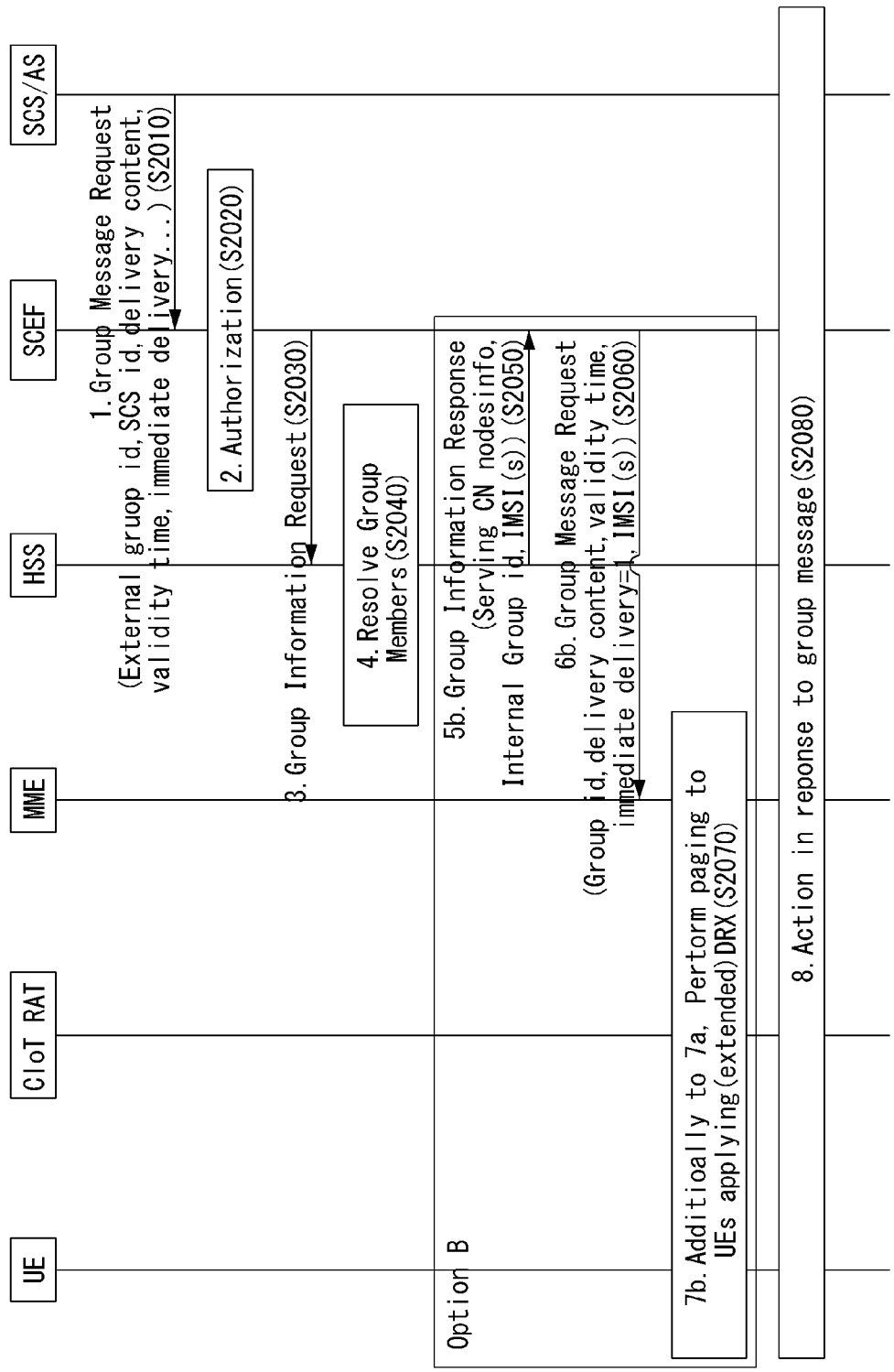
[FIG. 20]

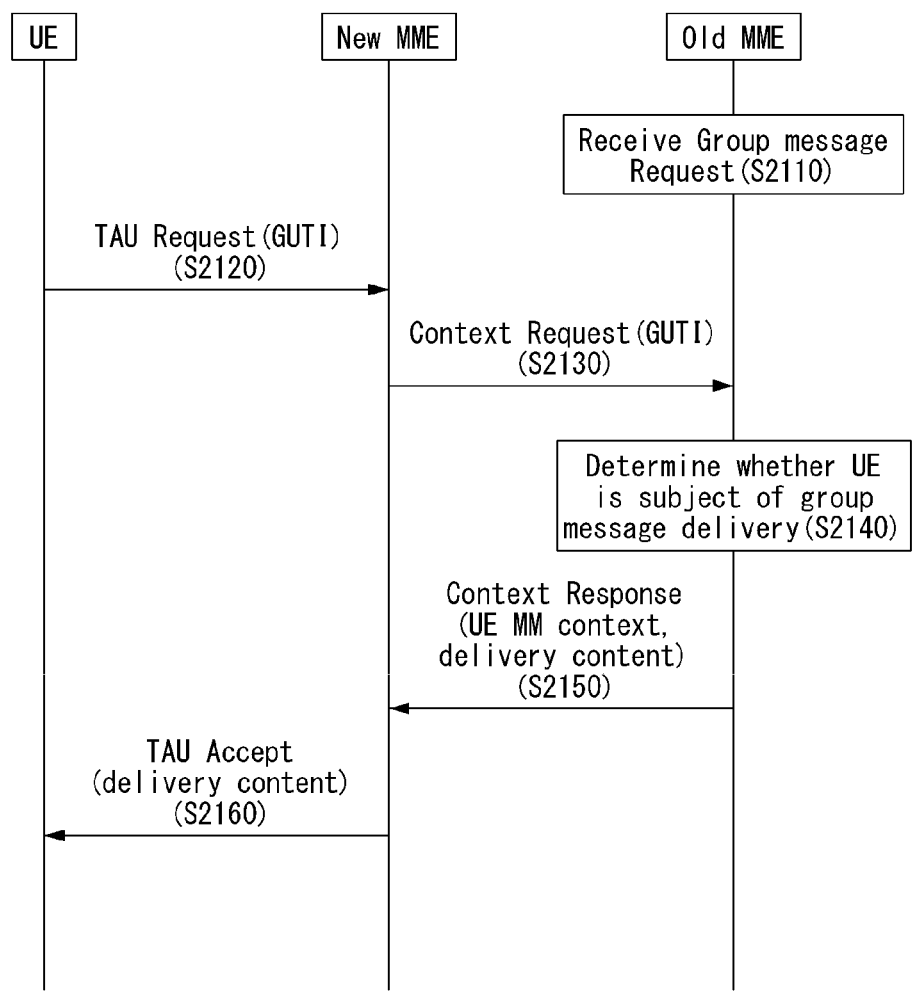
[FIG. 21]

[FIG. 22]
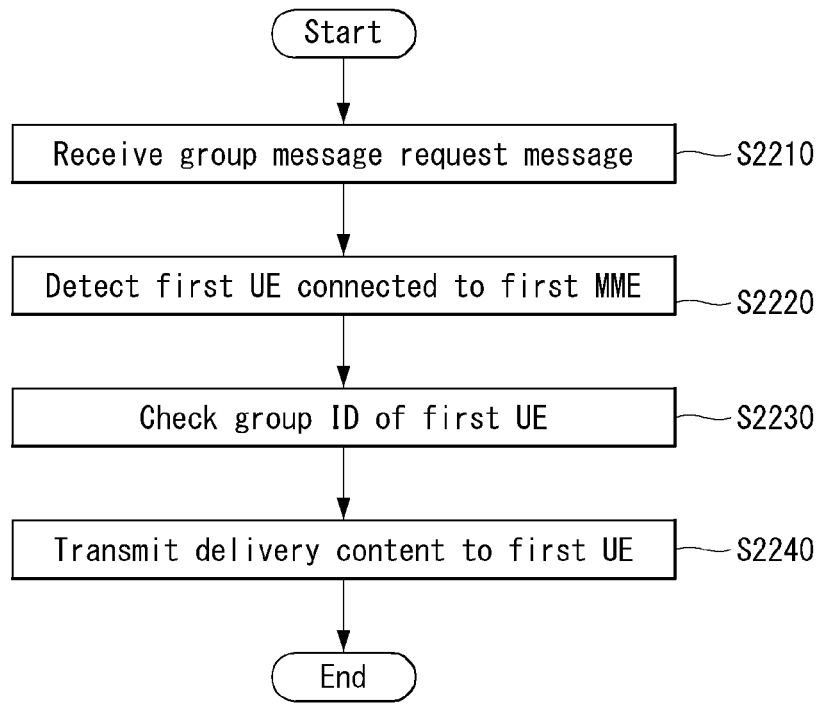
[FIG. 23]
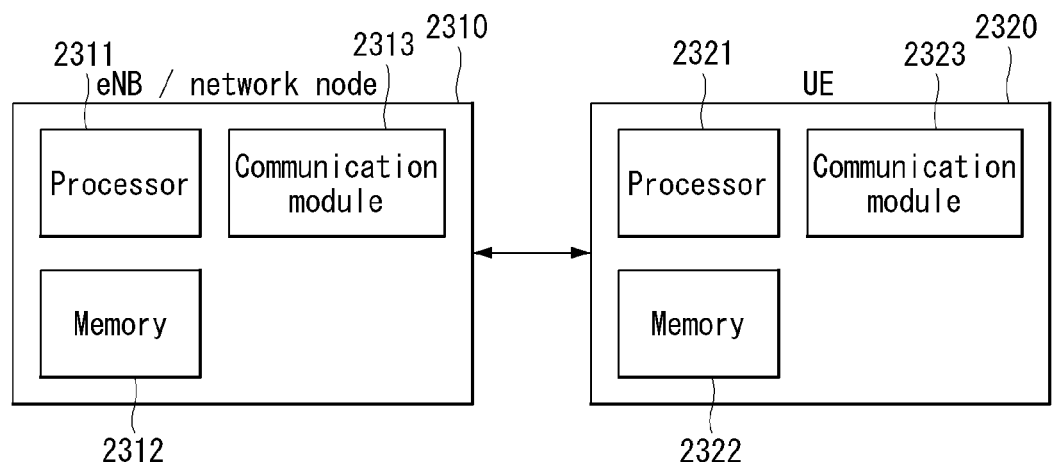

[FIG. 24]
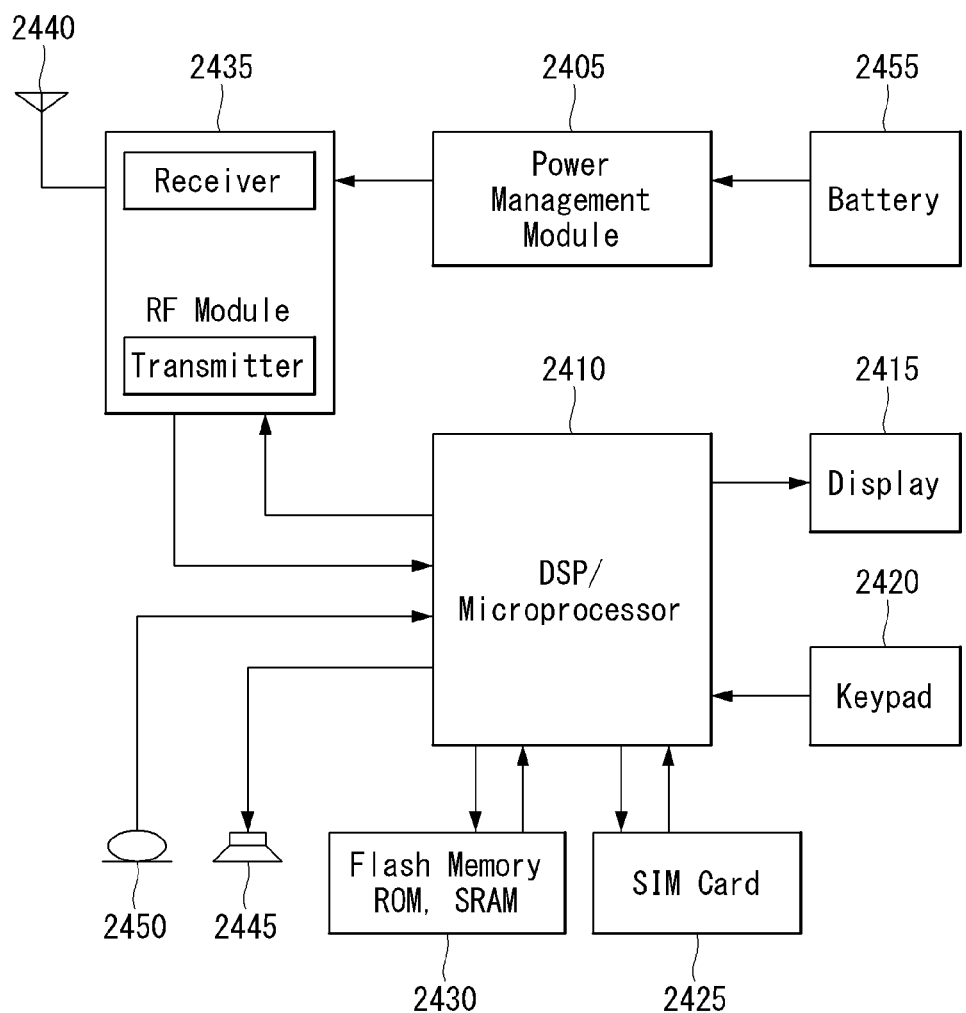

METHOD FOR GROUP MESSAGE TRANSMISSION IN WIRELESS COMMUNICATION SYSTEM AND APPARATUS THEREFOR

CROSS REFERENCE TO RELATED APPLICATIONS

This application is the National Phase of PCT International Application No. PCT/KR2016/007073, file on Jun. 30, 2016, which claims priority under 35 U.S.C. 119(e) to U.S. Provisional Application No. 62/186,385, filed on Jun. 30, 2015, all of which are hereby expressly incorporated by reference into the present application.

TECHNICAL FIELD

The present invention relates to a wireless communication system and, more particularly, to a method for transmitting, by a mobility management entity (MME), a group message to a group unit to which a plurality of UEs belongs and an apparatus supporting the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DISCLOSURE

Technical Problem

Group message delivery is an essential function for efficient cellular Internet of Things (CIoT) in terms of resource optimization and management convenience for a $3^{rd}$ party service provider. However, the first release (i.e., Release 13) of the CIoT radio access technology (RAT) has disclosed that a CIoT UE does not support the MBMS function.

However, the SCS/AS that is still the $3^{rd}$ party service providing stage may transmit a message to a CIoT UE based on a group. In particular, in the case of the triggering and/or software upgrade of a specific procedure, it is much easy and convenient for the SCS/AS to transmit a message to a group unit rather than to transmit a message to many UEs belonging to the same group one by one.

Accordingly, an object of this specification is to propose an alternative mechanism for group message delivery to a CIoT UE that does not support a broadcast communication method, such as an MBMS.

There are proposed embodiments regarding a method and apparatus for solving the technical problems. Technical objects of the present invention are not limited to the aforementioned objects and other technical objects not described above will become evident to those skilled in the art from the following description.

Technical Solution

A method of transmitting, by a first mobility management entity (MME), a group message to a group unit to which a plurality of user equipments (UEs) belongs in a wireless communication system according to an embodiment of the present invention may comprising the steps of receiving a group message request message requesting a transmission of a group message, wherein the group message request message includes the group identifier (ID) of the group by which the group message is to be received, delivery content to be transmitted to the group and a validity time buffering the delivery content; detecting a first UE connected to the first MME within the validity time; checking whether the group ID of the detected first UE is identical with the group ID of the group message request message; and transmitting the delivery content to the first UE if the two group IDs are identical.

Furthermore, the delivery content may be transmitted in a control plane through a non-access stratum (NAS) protocol data unit (PDU).

Furthermore, the group message request message further includes an immediate delivery parameter indicating whether the group message is to be immediately delivered. The immediate delivery parameter may be set as a value not indicating the immediate delivery of the group message.

Furthermore, the group message request message may further include or may not include the international mobile subscriber identity (IMSI) of the plurality of UEs belonging to the group.

Furthermore, the method of transmitting a group message may further include the step of marking whether the delivery content has been successfully received for each UE using the IMSI of the plurality of UEs if the IMSI of the plurality of UEs is included in the group message request message.

Furthermore, the step of detecting the first UE connected to the first MME may be the step of detecting the first UE connected to the first MME according to a tracking area update (TAU) procedure or mobile originated call procedure of the first UE.

Furthermore, if the first UE performs a periodic TAU procedure, the validity time may be set identically with the periodic TAU time.

Furthermore, the method of transmitting a group message may further include the steps of receiving a context request message requesting mobility management (MM) context of a second UE from a second MME within the validity time, wherein the context request message includes a globally unique temporary identity (GUTI) of the second UE; checking the group ID of the second UE using the GUTI; checking whether the group ID of the second UE is identical with the group ID of the group message request message; and transmitting a context response message including the delivery content and the MM context of the second UE to the second MME if the two group IDs are identical.

Furthermore, the step of checking the group ID of the second UE using the GUTI may be the step of checking the group ID corresponding to a GUTI within the MM context of the second UE.

Furthermore, a method of transmitting, by a first mobility management entity (MME), a group message to a group unit to which a plurality of user equipments (UEs) belongs in a wireless communication system according to another embodiment of the present invention may comprising the steps of receiving a group message request message requesting a transmission of a group message, wherein the group message request message includes a group identifier (ID) of the group by which the group message is to be received, delivery content to be transmitted to the group and an international mobile subscriber identity (IMSI) of the plurality of UEs belonging to the group; transmitting a paging message to the plurality of UEs having the IMSI; and transmitting the delivery content to at least one of the plurality of UEs if the at least one UE is connected.

Furthermore, the delivery content may be transmitted in a control plane through a non-access stratum (NAS) protocol data unit (PDU).

Furthermore, at least one UE of the plurality of UEs may correspond to a UE to which discontinuous reception (DRX) or extended DRX (eDRX) is applied.

Furthermore, the group message request message further includes an immediate delivery parameter indicating whether the group message is to be immediately delivered. The immediate delivery parameter may be set as a value indicating the immediate delivery of the group message.

Furthermore, the method of transmitting a group message may further include the step of marking whether the delivery content has been successfully received for each UE using the IMSI of the plurality of UEs.

Furthermore, the case where the at least one UE of the plurality of UEs is connected may be a case where a service request message which is an initial non-access stratum (NAS) message is received from the at least one UE as a response to the paging message.

Advantageous Effects

In accordance with an embodiment of the present invention, there is an effect in that the SCS/AS can transmit a group message to a UE connected to the MME during a validity time through one group message delivery even without a separate additional connection setup procedure for group message delivery. In particular, the MME does not need to perform a separate user plane setup procedure with a UE because it transmits delivery content/data through an NAS PDU in a control plane. Furthermore, the MME does not need to separately perform a paging procedure in order to transmit a group message. Furthermore, there are effects in that the number of times (or frequency) that the UE wakes up is reduced because the UE does not need to additionally wake up in order to receive a group message and power consumption is reduced because the IDLE mode of the UE is maintained long.

Furthermore, in accordance with another embodiment of the present invention, there is an advantage in that whether a group message is delivered to each UE can be checked because the MME receives the IMSI of UE(s) belonging to a target delivery group. There is an effect in that a group message can be delivered to each UE more rapidly because a paging message is transmitted to a UE to which DRX/eDRX is being applied in order to immediate deliver the group message.

Furthermore, in accordance with another embodiment of the present invention, there is an effect in that there is provided a reliable group message delivery mechanism by which a UE can stably receive a group message although an MME providing service is changed.

Technical effects of the present invention are not limited to the technical effects described above, and other technical effects not mentioned herein may be evidently understood by a person having ordinary skill in the art to which the present pertains from the description below.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates structures of an E-UTRAN and an EPC in a wireless communication system to which the present invention may be applied.

FIG. 4 illustrates a radio interface protocol structure between a UE and an E-UTRAN in a wireless communication system to which the present invention may be applied.

FIG. 5 illustrates an S1 interface protocol structure in a wireless communication system to which the present invention may be applied.

FIG. 6 illustrates a physical channel structure in a wireless communication system to which the present invention may be applied.

FIG. 7 illustrates an EMM and ECM states in a wireless communication system to which the present invention may be applied.

FIG. 8 illustrates a bearer structure in a wireless communication system to which the present invention may be applied.

FIG. 9 illustrates transmission paths of a control plane and a user plane in an EMM registration state in a wireless communication system to which the present invention may be applied.

FIG. 10 illustrates an ECM connection establishment procedure in a wireless communication system to which the present invention may be applied.

FIG. 11 illustrates a contention-based random access procedure in a wireless communication system to which the present invention may be applied.

FIG. 12 illustrates a UE-triggered service request procedure in a wireless communication system to which the present invention may be applied.

FIG. 13 illustrates a network-triggered service request procedure in a wireless communication system to which the present invention may be applied.

FIG. 14 illustrates a paging procedure in a wireless communication system to which the present invention may be applied.

FIG. 15 illustrates a periodic tracking area update procedure in a wireless communication system to which the present invention may be applied.

FIG. 16 illustrates a tracking area update procedure accompanied by an S-GW change in a wireless communication system to which the present invention may be applied.

FIG. 17 is a diagram illustrating machine-type communication (MTC) architecture in a wireless communication system to which the present invention may be applied.

FIG. 18 illustrates architecture for Service Capability Exposure in a wireless communication system to which the present invention may be applied.

FIGS. 19 and 20 are flowcharts regarding a group message delivery method according to an embodiment of the present invention.

FIG. 21 is a flowchart regarding a group message delivery method when an MME moves according to an embodiment of the present invention.

FIG. 22 is a diagram showing an operating flowchart of a first MME according to an embodiment of the present invention.

FIG. 23 illustrates the block diagram of a communication device according to an embodiment of the present invention.

FIG. 24 illustrates the block diagram of a communication device according to an embodiment of the present invention.

BEST MODE

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |

TABLE 1-continued

| Reference point | Description |
| --- | --- |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity)

management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 illustrates an S1 interface protocol structure in a wireless communication system to which the present invention can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM State

In what follows, EPS Mobility Management (EMM) and EPS Connection Management (ECM) states will be described.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

EPS Bearer

FIG. 8 illustrates a bearer structure in a wireless communication system to which the present invention can be applied.

When the UE is connected to a Packet Data Network (PDN) (which is the peer entity of FIG. 8), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other in Up/Downlink. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 9 illustrates transmission paths of a control plane and a user plane in an EMM registration state in a wireless communication system to which the present invention can be applied.

FIG. 9(a) illustrates ECM-CONNECTED state, and FIG. 9(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 9(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 9(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

FIG. 10 illustrates an ECM connection establishment procedure in a wireless communication system to which the present invention may be applied.

Referring to FIG. 10, a UE transmits an RRC Connection Request message to an eNB to request an RRC connection S1001.

The RRC Connection Request message includes a UE Identity (for example, S-TMSI (SAE Temporary Mobile Subscriber Identity) or random ID) and an establishment cause.

The establishment cause is determined according to a NAS procedure (for example, attach, detach, tracking area update, service request, and extended service request).

The eNB transmits an RRC Connection Setup message to the UE in response to the RRC Connection Request message.

After receiving the RRC Connection Setup message, the UE transitions to the RRC_CONNECTED mode.

The UE transmits an RRC Connection Setup Complete message to the eNB to confirm successful completion of RRC connection establishment S1003.

The UE includes a NAS message (for example, an Initial Attach message and a Service Request message) in the RRC Connection Setup Complete message and transmits the RRC Connection Setup Complete message to the eNB.

The eNB obtains a Service Request message from the RRC Connection Setup Complete message and delivers the obtained Service Request message to the MME by using an Initial UE message that is an S1AP message S1004.

A control signal between the eNB and the MME is delivered through the S1AP message at the S1-MME interface. The S1AP message is delivered through an S1 signaling connection for each user, and the S1 signaling connection is defined by an allocated identity pair (namely eNB UE S1AP ID and MME UE S1AP ID) for the eNB and the MME to identify the UE.

The eNB allocates the eNB UE S1AP ID, includes it in the Initial UE message, and transmits the Initial UE message to the MME. The MME receives the Initial UE message, allocates the MME UE S1AP UE ID, and establishes an S1 signaling connection between the eNB and the MME.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

- The case in which a UE performs initial access in an RRC idle state in the absence of an RRC connection to an eNB
- The case in which a UE performs an RRC connection re-establishment procedure
- The case in which a UE connects to a target cell for the first time while performing a handover procedure
- The case in which a random access procedure is requested by a command from an eNB
- The case in which downlink data are generated while uplink synchronization is not met in the RRC connected state
- The case in which uplink data are generated while uplink synchronization is not met in the RRC connected state or a designated radio resource used for requesting a radio resource is not allocated
- The case in which positioning of a UE is performed while timing advance is needed in the RRC connected state
- The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

FIG. 11 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

Service Request Procedure

For most cases, the UE-triggered Service Request procedure is used when the UE initiates a new service or attempts.

FIG. 12 illustrates a UE-trigger Service Request procedure in a wireless communication system to which the present invention can be applied.

1-2. The UE initiates a UE-triggered Service Request procedure by transmitting a Service Request message to the MME.

The Service Request message is delivered being included in an RRC connection setup complete message through the RRC connection and delivered being included in an initial UE message through the S1 signaling connection.

3. For authentication of the UE, the MME requests and receives information for the authentication from the HSS; and performs mutual authentication with the UE.

4. The MME transmits an Initial Context Setup Request message to the eNB so that the eNB can configure an S1 bearer with the S-GW and configure a DRB with the UE.

5. The eNB transmits an RRC Connection Reconfiguration message to the UE to create the DRB.

When this procedure is done, the creation of DRB is completed between the eNB and the UE, and all of uplink EPS bearers ranging from the UE to the P-GW are configured. The UE can transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the creation of S1 bearer is completed between the eNB and the S-GW, and then all of the downlink EPS bearers ranging from the P-GW and the UE are configured. The UE can then receive downlink traffic data from the P-GW.

8. In the case that a cell (E-UTRAN Cell Global Identifier (ECGI)) in which a UE is located or the tracking area (TAI) is changed, the S-GW notifies by transmitting a Modify Bearer Request message to the P-GW.

9. If needed, the P-GW can perform an IP connectivity access network (IP-CAN) session modification procedure with the PCRF.

10. Receiving a Modify Bearer Request message from the S-GW, the P-GW transmits a Modify Bearer Response message to the S-GW in response to the message.

11. The S-GW transmits a Modify Bearer Response message to the MME in response to the Modify Bearer Request message.

A network-triggered Service Request procedure is usually performed when the network attempts to transmit downlink data to the UE staying in the ECM-IDLE state.

FIG. 13 illustrates a Network-triggered Service Request procedure in a wireless communication system to which the present invention can be applied.

1. If downlink data arrives at the P-GW via an external network, the P-GW delivers downlink data to the S-GW.

2. In case the downlink S1 bearer is released (i.e., ECM-IDLE state) and unable to transmit downlink data to the eNB (namely, in case 'S1 eNB TEID' value is not found in the S-GW), the S-GW buffers the received downlink data. And the S-GW transmits a Downlink Data Notification message to the MME/SGSN to which the UE is registered for signaling connection and bearer configuration with respect to the corresponding UE.

The MME/SGSN transmits a Downlink Data Notification ACK message to the S-GW in response to the Downlink Data Notification message.

3. The MME transmits a paging message to all the eNB/RNC (or Base Station Controller (BSC)) belonging to the tracking area to which the UE has most recently registered.

4. If the eNB/RNC (or BSC) receives a paging message from the MME/SGSN, the eNB/RNC (or BSC) broadcasts the paging message.

5. The UE, noticing the existence of downlink data directed to itself, sets up an ECM connection by performing a Service Request procedure. That is, in this case, the service request procedure is initiated by paging sent from the network.

The Service Request procedure can be performed in the same way as the procedure of FIG. 12, and if the procedure is completed, the UE can receive downlink data from the S-GW.

6. If receiving a paging response, the S-GW transmits a "Stop Paging" message to the MME/SGSN.

If the MME/SGSN commands the eNB/RNC (or BSC) or cells to perform paging transmission, the eNB/RNC (or BSC) calculates a paging occasion through the IMSI value and DRX cycle of the UE and transmits a paging message at the corresponding paging occasion. In case there is no response from the UE for a specific time period with respect to the paging transmission, the MME may consider the situation as a paging transmission failure and command the eNB/RNC (or BSC) or cells to perform paging retransmission.

In other words, the MME determines paging retransmission when the MME fails to receive a service request from the UE; the eNB does not supervise paging reception or perform paging retransmission. In case the MME transmits a paging message to a large number of cells, the UE transmits a service request while belonging to one of the cells; therefore, if there is no response to the paging message, the eNB may determine that the corresponding UE does not belong to the cell of the eNB.

Meanwhile in case the MME/SGSN does not receive a response from the UE after the paging repetition/retransmission procedure, the MME/SGSN notifies the S-GW of a paging failure by using a Downlink Data Notification Reject message.

Receiving the Downlink Data Notification Reject message, the S-GW may delete a buffered packet(s).

Paging

The paging procedure in a network is used to transmit paging information to a UE in the RRC_IDLE mode, notify a UE in the RRC_IDLE/RRC_CONNECTED mode of change of system information, notify a UE in the RRC_IDLE/RRC_CONNECTED mode of ETWS primary notification and/or ETWS secondary notification, or notify a UE in the RRC_IDLE/RRC_CONNECTED mode of CMAS notification.

FIG. 14 illustrates a paging procedure in a wireless communication system to which the present invention may be applied.

Referring to FIG. 14, the MME initiates the paging procedure by transmitting a S1AP paging message to the eNB S1401.

As described above, the MME manages the location of a UE in the ECM-IDLE state on the basis of a Tracking Area (TA). At this time, since the UE may be registered to one or more TAs, the MME may transmit a paging message to a plurality of eNBs covering a cell belonging to the TA(s) to which the UE is registered. Here, each cell may belong to only one TA, and each eNB may include cells belonging to different TAs.

Here, the MME transmits a paging message to each eNB through S1AP interface (or S1AP protocol). Hereinafter, this is referred to as 'S1AP PAGING message (or paging request)'.

Table 2 exemplifies an 'S1AP PAGING message.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |

TABLE 2-continued

| IE/Group Name | Presence | Range | IE type and reference | Semantics description | Criticality | Assigned Criticality |
|---|---|---|---|---|---|---|
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| CSG Id List | | 0 ... 1 | | | GLOBAL | ignore |
| >CSG Id | | 1 ... <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

Referring to Table 2, IE/Group Name represents the name of an information element (IE) or IE group. 'M' in the Presence field refers to a mandatory IE and indicates an IE/IE group that is always included in a message. 'O' indicates an optional IE and refers to an IE/IE group that may or may not be included in a message. 'C' indicates a conditional IE and refers to an IE/IE group included in a message included only when a specific condition is met. The Range field represents the number of repetition of repetitive IEs/IE groups.

The IE type and reference field represents the type of the corresponding IE (for example, enumeration, integer, and octet string) and represents a range of values that the corresponding IE may have.

The Criticality field represents criticality information applied to the IE/IE group. The criticality information indicates how a receiving side should operate in case the receiving side does not understand the whole or part of the IE/IE group. '-' symbol indicates that criticality information is not applied, while 'YES' indicates that criticality information is applied. 'GLOBAL' indicates that an IE and repetition of the corresponding IE have the same criticality information. 'EACH' indicates that each repetition of an IE has unique criticality information. The Assigned Criticality field represents actual criticality information.

In what follows, the IE or IE group included in the S1AP paging message will be described in more detail.

The Message Type IE identifies a transmitted message uniquely.

The UE Identity Index value IE is used for the eNB to calculate a Paging Frame (PF) (for example, UE Identity Index=UE IMSI mod 1024).

The UE Paging Identity IE is an Identity for identifying a paged UE and is indicated by one of IMSI and S-TMSI (SAE Temporary Mobile Subscriber Identity). The S-TMSI is an identity for identifying an UE uniquely within one MME group.

In the case of general paging, the S-TMSI is used as a UE paging identity. On the other hand, in case an IMSI is used as the UE paging identity, which is denoted as Paging with IMSI, the UE performs a re-attach procedure when it receives a paging message as the IMSI value.

The Paging DRX IE is used for the eNB to calculate the Paging Frame (PF) in case the UE uses a specific DRX cycle length. The UE may specify the DRX cycle length in an Attach Request message or Tracking Area Update (TAU) message.

The CN Domain IE indicates whether paging originates from a CS (Circuit Switched) domain or PS (Packet Switched) domain.

The Tracking Area Identity (TAI) List IE is used for informing the eNB of a TA over which a paging message has to be broadcast. The TAI refers to an identity used for identifying a TA uniquely.

The Closed Subscriber Group (CSG) ID List IE represents a CSG set to which the UE has subscribed. The CSG ID List IE prevents the eNB from paging a UE within a CSG cell to which the UE is not subscribed.

The Paging Priority IE indicates a paging priority for paging a UE.

The UE Radio Capability IE for Paging includes a paging-specific UE radio capability information.

The eNB, which has received the S1AP paging message from the MME, constructs a paging message (in what follows, it is called an 'RRC Paging message' or paging information).

Table 3 illustrates the RRC Paging message.

TABLE 3

```
-- ASN1START
Paging ::=                      SEQUENCE {
        pagingRecordList        PagingRecordList OPTIONAL,      -- Need ON
        systemInfoModification  ENUMERATED {true}   OPTIONAL,   -- Need ON
        etws-Indication         ENUMERATED {true}   OPTIONAL,   -- Need ON
        nonCriticalExtension    Paging-v890-IEs     OPTIONAL    -- Need OP
}
Paging-v890-IEs ::=             SEQUENCE {
        lateNonCriticalExtension  OCTET STRING      OPTIONAL,   -- Need OP
        nonCriticalExtension    Paging-v920-IEs     OPTIONAL    -- Need OP
}
Paging-v920-IEs ::=             SEQUENCE {
        cmas-Indication-r9      ENUMERATED {true}   OPTIONAL,   -- Need ON
        nonCriticalExtension    Paging-v1130-IEs    OPTIONAL    -- Need OP
}
Paging-v1130-IEs ::=            SEQUENCE {
```

TABLE 3-continued

```
        eab-ParamModification-r11    ENUMERATED {true}           OPTIONAL,      -- Need ON
        nonCriticalExtension         SEQUENCE { }                OPTIONAL       -- Need OP
}
PagingRecordList ::=                 SEQUENCE (SIZE (1..maxPageRec)) OF PagingRecord
PagingRecord ::=                     SEQUENCE {
        ue-Identity                      PagingUE-Identity,
        cn-Domain                        ENUMERATED    {ps, cs},
        ...
}
PagingUE-Identity ::=                CHOICE {
        s-TMSI                           S-TMSI,
        imsi                             IMSI,
        ...
}
IMSI ::=                             SEQUENCE (SIZE (6..21)) OF IMSI-Digit
IMSI-Digit ::=                       INTEGER (0..9)
-- ASN1STOP
```

Referring to Table 3, a single RRC paging message may carry information of multiple S1AP paging messages. In other words, an RRC paging message may include multiple paging records (for example, 16) for paging multiple UEs.

Each paging record includes a UE Identity field and CN-Domain field. These fields are contents delivered by the S1AP paging message.

The systemInfoModification field is not delivered by the S1AP paging message but is generated by the eNB. This field is used to trigger the UE to re-acquire a System Information Block (SIB) set.

The Extended Access Barring (EAB)-ParamModification field is used to indicate modifying the EAB parameter (SIB 14).

The ETWS-Indication field is not delivered by the S1AP paging message but is generated by the eNB. This field is applied only to an ETWS capable UE and is used to trigger the corresponding UE to re-acquire SIB 1. The SIB 1 content indicates the ETWS content within the SIB 10 and SIB 11 for the UE.

The CMAS-Indication field is applied only to the CMAS capable UE that supports the CMAS and is used to trigger the corresponding UE to re-acquire SIB 1. The SIB 1 content indicates the CMAS content within the SIB 12 for the UE.

The eNB that construct an RRC paging message as such transmits a downlink control information (DCI) to which cyclic redundancy check (CRC) scrambled with a Paging-RNTI (P-RNTI) is attached to a UE in a PDCCH (step, S1402), and transmits the RRC paging message to the UE through a PDSCH (step, S1403).

That is, the eNB forwards the RRC paging message to the UE through a PCCH logical channel, a PCH transport channel and a PDSCH physical channel.

More specifically, the eNB determines the PDCCH format according to the DCI to be transmitted to the UE and attaches a CRC to the DCI. The CRC is scrambled (or masked) with a unique RNTI (Radio Network Temporary Identifier) according to the owner or intended use of the PDCCH. In the case of a PDCCH for a specific UE, the CRC may be masked with a unique identifier of the UE (for example, C-RNTI (Cell-RNTI)) may be masked. Similarly, in the case of a PDCCH for a paging message, the CRC may be masked with a paging indication identifier (for example, P-RNTI (Paging-RNTI)).

That is, a UE monitors a PDCCH based on the P-RNTI in a subframe belonged to its own paging occasion 1412. In addition, when detecting a PDCCH masked with the P-RNTI, the UE decode a DCI transmitted on the PDCCH. This DCI indicates the PDSCH resource on which a paging message is transmitted to the UE. And, the UE decodes an RRC paging message from the PDSCH resource indicated in the DCI.

A paging cycle 1413 may be determined as cell-specific manner, and may also be determined as UE-specific manner. Furthermore, the paging occasion 1412 is determined based on its own paging cycle 1413 and its own identifier (i.e., IMSI) for each UE. Accordingly, a paging message is not transmitted to all UEs in the possible paging occasion 1411 in an eNB, but a paging message is transmitted in accordance with the paging occasion of the corresponding UE. The paging occasion is described in more detail below.

A paging procedure may be used for notifying of change of system information, reception of a cell broadcast message (namely ETWS/CAMS warning message), and change of EAB parameter in addition to notification of reception of an MT (Mobile Terminated) call by each UE.

In case a UE identity (for example, IMSI or S-TMSI) is included in one of paging records belonging to an RRC paging message (in other words, the paging procedure is used for notification of an MT call), a UE in the RRC_IDLE mode initiates a random access procedure to establish an RRC connection to the network (for example, to transmit a Service Request).

Also, in case the RRC paging message includes systemInfoModification, the UE re-acquires required system information by using a system information acquisition procedure.

Also, in case ETWS-indication is included in the RRC paging message and the UE supports the ETWS, the UE re-acquires SIB 1 immediately. In other words, the UE does not wait until the next system information modification. And if a scheduling information list (schedulingInforList) belonging to the SIB 1 indicates existence of SIB 10, the UE acquires the SIB 10 by using scheduling information (schedulingInfor). Also, if the scheduling information list (schedulingInfoList) belonging to the SIB 1 indicates existence of SIB 11, the UE acquires the SIB 11 by using the scheduling information (schedulingInfor).

Also, in case a CMAS-Indication is included in the RRC paging message and the UE support the CMAS, the UE re-acquires the SIB 1 immediately. In other words, the UE does not wait until the next system information modification. And if a scheduling information list (schedulingInfoList) belonging to the SIB 1 indicates existence of SIB 12, the UE acquires the SIB 12 by using scheduling information (schedulingInfor).

As described above, in case an RRC paging message includes cell broadcast message (namely ETWS/CAMS message) indication, the UE receives SIB 10, SIB 11, and SIB 12 with reference to the schedulingInfoList of the SIB 1. The received SIB 10, SIB 11, and SIB 12 are transmitted to the upper layer of the UE (for example, RRC layer). In the upper layer of the UE, if a message identifier belonging to a cell broadcast message transmitted through the SIB 10, SIB 11, and SIB 12 is included in a search list of the UE, the message identifier is displayed on the UE, but discarded otherwise.

Also, in case a UE in the RRC_IDLE mode supports EAB and the RRC paging message includes an EAB parameter modification (eab-ParamModification) field, the UE considers that a previously stored SIB 14 is not valid and re-acquires SIB 1 immediately. In other words, the UE does not wait until the next system information modification. And the UE re-acquires SIB 14 by using the system information acquisition procedure.

In what follows, paging occasion will be described.

The 3GPP LTE/LTE-A system defines DRX (Discontinuous Reception) scheme for a UE to minimize power consumption.

A UE employing DRX monitors transmission of a paging message only at one paging occasion for each paging cycle (namely DRX cycle).

One paging fame (PF) refers to one radio frame that may include one or more paging occasion(s).

One paging occasion (PO) refers to one subframe having a P-RNTI transmitted on a PDCCH addressing a paging message. In other words, a paging occasion is defined as a specific subframe within a PF for which a UE checks a paging message.

A PF and a PO are determined from an IMSI and DRX value of the UE. The UE may calculate a PF and PO by using its IMSI and DRX value. Also, the eNB may also calculate a PF and PO for each UE by using the IMSI value received from the MME.

A DRX parameter (namely paging/PCCH configuration information) may be transmitted by being included in a common radio resource configuration ('RadioResourceConfigCommon') IE, which is an RRC message used for specifying common radio resource configuration. The common radio resource configuration IE may be transmitted through an RRC message such as an RRC Connection Reconfiguration message or SI message. An SI message is used for transmitting one or more SIBs.

Also, the UE may request its own DRX cycle through an Attach Request or TAU (Tracking Area Update Request) message. At this time, a DRX cycle length set that may be requested by the UE is the same as a length set used within the system information.

Table 4 illustrates PCCH configuration information within the common radio resource configuration IE.

TABLE 4

```
PCCH-Config ::=        SEQUENCE {
    defaultPagingCycle      ENUMERATED {
                                rf32, rf64, rf128, rf256},
    nB                      ENUMERATED {
                                fourT, twoT, oneT, halfT, quarterT,
                                oneEighthT, oneSixteenthT,
                                oneThirtySecondT}
}
```

Referring to Table 4, PCCH configuration information includes a 'defaultPagingCycle' field indicating a default paging cycle length and a parameter 'nB' for acquiring a paging frame and a paging occasion.

The 'defaultPagingCycle' field may be set to one of {rf32, rf64, rf128, rf256} values for the default paging cycle length. Here, rf represents a radio frame, and the number subsequent to rf represents the number of radio frames. For example, if 'defaultPagingCycle'=rf32, the default paging cycle comprises 32 radio frames, while, if 'defaultPagingCycle'=rf64, the default paging cycle comprises 64 radio frames.

The value of 'nB' parameter is specified by a multiple of 'T' (4T, 2T, T, T/2, T/4, T/8, T/16 or T/32). For example, if 'nB'=fourT, the value of 'nB' parameter is 4*T while, if 'nB'=quarterT, the value of 'nB' parameter is T/4.

Here, 'T' represents the DRX cycle of the UE. 'T' is determined by the shorter of a UE-specific DRX cycle (in case the DRX cycle is allocated by a upper layer) and the default DRX cycle (the 'defaultPagingCycle' field value) broadcast from the system information. In case the UE-specific DRX cycle is not set by the upper layer, it is determined as the default DRX cycle.

The PF is determined by Equation 1 below.

$$\text{SFN mod } T = (T \text{ div } N)*(UE\_ID \text{ mod } N) \quad \text{[Equation 1]}$$

In Equation 1, N represents min(T, nB), and UE_ID represents (IMSI mod 1024).

The UE does not monitor all of the subframes of the PF determined by Equation 1. Instead, the UE monitors only those subframes identified by PO determined by Equation 2 and Table 5 (or Table 6) below.

$$i\_s = \text{floor}(UE\_ID/N) \text{ mod } Ns \quad \text{[Equation 2]}$$

In Equation 2, Ns represents max(1, nB/T).

Table 5 illustrates a subframe pattern for determining a PO in the FDD scheme.

TABLE 5

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 6 illustrates a subframe pattern for determining a PO in the TDD scheme.

TABLE 6

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

By applying i_s value determined in Equation 2 above to Tables 5 and 6, a subframe index corresponding to a PO is determined. That is, a UE monitors the subframe corresponding to a PO only in the determined PF.

For example, in the case that a DRX cycle of a UE is 320 ms (i.e., 32 radio frame=rf32), radio frame 4 and radio frame 36, . . . may be determined to PF based on Equation 1 above. In this case, a UE monitors a paging message only in subframe 9 of radio frame 4 and subframe 9 of radio frame 36, which are Ops determined based on Equation 2 and Table 5 (or Table 6) above.

Periodic TAU Procedure

The Tracking Area Update (TAU) procedure is performed when the UE staying in the ECM-IDLE state attempts registering a new position or the TAU timer expires.

FIG. 15 illustrates a periodic tracking area update procedure in a wireless communication system to which the present invention may be applied.

1-2. In the case that the TAU timer of the UE in the ECM-IDLE state expires, the Periodic TAU (P-TAU) procedure for reporting a Tracking Area (TA) to the MME is triggered.

The UE initiates the P-TAU procedure by transmitting a TAU Request message to the MME.

The TAU Request message is delivered being included in an RRC connection setup complete message through the RRC connection and is delivered being included in the initial UE message through the S1 signaling connection.

3. The MME which receives the TAU Request message resets the TAU timer and transmits a Modify Bearer Request message including an E-UTRAN Cell Global Identifier (ECGI) and a TAI to the S-GW.

4-5. In the case that the cell (ECGI) or the tracking area (TAI) in which the UE is located changes, the S-GW transmits the Modify Bearer Request message to the P-GW.

The P-GW performs an EPS session update procedure and transmits a Modify Bearer Response message to the S-GW in response to the Modify Bearer Request message.

6. The S-GW transmits a Modify Bearer Response message to the MME in response to the Modify Bearer Request message.

7-8. The MME transmits a TAU Accept message to the UE in response to the TAU Request message.

The TAU Accept message may include the TAU timer.

The TAU Accept message is delivered being included in a downlink NAS transport message through the S1 signaling connection and delivered being included in a downlink information transfer message through the RRC connection.

9. The MME that completes a position update of the UE releases connection to the UE used for transmission and reception of the periodic TAU-related message and transmits UE context release command to the eNB to release the user context set up within the E-UTRAN.

10. The eNB deletes the context of the UE and releases resources allocated to the UE. Furthermore, the eNB releases RRC connection to the UE by transmitting an RRC connection release message to the UE.

11. The eNB transmits UE context release complete message to the MME in response to UE context release command message, thereby releasing the S1 signaling connection between the eNB and the MME.

When the procedure above is completed, the UE again makes a transition to the ECM-IDLE state.

Discontinuous Reception (DRX) Mode

The 3GPP LTE/LTE-A system defines an EPS Connection Management (ECM)-CONNECTED state and an ECM-IDLE state to manage signaling connection between a UE and a network. The ECM-CONNECTED state and ECM-IDLE state may also be applied to the UE and the MME. An ECM connection includes an RRC connection established between the UE and an eNB, and S1 signaling connection established between the eNB and the MME. An RRC state represents whether an RRC layer of the UE is logically connected to an RRC layer of the eNB. In other words, in the case that the RRC layer of the UE and the RRC layer of the eNB are connected with each other, the UE stays in an RRC_CONNECTED state. On the other hand, in the case that the RRC layer of the UE is not connected to the RRC layer of the eNB, the UE stays in the RRC_IDLE state.

At this time, the RRC_CONNECTED state is referred to as the state in which the UE is connected to a specific cell and indicates that the UE may receive a service in the cell unit, where the UE is managed in a unit of cell.

An RRC_IDLE state is referred to as the state in which no connection is established between the UE and the eNB, but only the connection to a Mobility Management Entity (MME) is maintained, and in the RRC_IDLE state, the UE is managed in a unit of the Tracking Area (TA) which is an area unit larger than a cell. In other words, the UE in the RRC_IDLE state wakes up intermittently and monitors a Paging Channel (PCH) to check whether there is a paging message being transmitted to the UE. That is, the UE performs Discontinuous Reception (DRX) configured by the Non-Access Stratum (NAS) by using the ID allocated uniquely in the tracking area. The UE may receive a broadcast signal of the system information and the paging information by monitoring a paging signal for a specific paging event at each UE-specific paging DRX cycle. The UE which does not receive any activated service through the aforementioned network state definitions eventually minimizes its power consumption, and thus the eNB may utilize resources efficiently.

As described above, in order to receive general mobile communication services such as voice and data communication, the UE has to make a transition to the ECM-CONNECTED state. As in the case when the UE is first powered on, the initial UE stays in the ECM-IDLE state, and when the UE successfully registers to the corresponding network through an initial attach procedure, the UE and the MME makes a transition to the ECM-CONNECTED state. In addition, in the case that the UE has been registered to the network but radio resources are not allocated to the UE as traffic is not activated, the UE stays in the ECM-IDLE state, and when uplink or downlink traffic is newly generated in the corresponding UE, the UE and the MME make a transition to the ECM-CONNECTED state through a Service Request procedure.

The 3GPP LTE/LTE-A system defines a dormant mode and an active mode even for the RRC_CONNECTED state to minimize power consumption of the UE.

According to the definition above, in the case that the UE staying in the RRC_CONNECTED state does not transmit or receive data for a predetermined time period, a cell connection is retained, but the UE is made to enter the dormant mode. The UE staying in the dormant mode has to occasionally wake up and monitor a physical control channel to receive data that may be transmitted to the UE.

As described above, a wireless communication system employs a Discontinuous Reception (DRX) scheme of the UE to minimize the power consumption of the UE.

The DRX method defined in the 3GPP LTE/LTE-A system may be used both for the dormant mode and the RRC_IDLE mode, and the DRX techniques used in the respective modes are as follows.

1) Dormant mode in the RRC_CONNECTED state
Short DRX: short DRX cycle (2 ms~640 ms)
Long DRX: long DRX cycle (10 ms~2560 ms)
2) RRC_IDLE state
Paging DRX: paging DRX cycle (320 ms~2560 ms)

The UE may perform monitoring of a PDCCH based on its own unique identifier, RNTI (e.g., C-RNTI, SI-RNTI, P-RNTI, and so on).

Monitoring of the PDCCH may be controlled by the DRX operation, and the eNB transmits the parameters related to the DRX to the UE through an RRC message. In particular, the UE has to always receive the SI-RNTI, P-RNTI, and so on irrespective of the DRX operation composed by the RRC message. At this time, the other PDCCHs except the PDCCH scrambled with the C-RNTI are always received through the common search space of a primary serving cell (e.g., Pcell).

In the case that the DRX parameters are configured while the UE is in the RRC_CONNECTED state, the UE performs discontinuous monitoring of the PDCCH based on the DRX operation. On the other hand, in the case that the DRX parameters are not configured, the UE performs continuous monitoring of the PDCCH.

In other words, the UE searches the PDCCH by performing blind decoding in a UE-specific search space of the PDCCH region based on the DRX operation. In the case that no CRC error is detected when the UE unmasks the CRC of the PDCCH by using the RNTI, the UE regards that the corresponding PDCCH delivers the UE's control information.

The Discontinuous PDCCH monitoring indicates that the UE monitors a PDCCH only in specific subframes, whereas the continuous PDCCH monitoring indicates that the UE monitors the PDCCH for all of the subframes. Meanwhile, in the case that the PDCCH monitoring is required in the operation unrelated to the DRX such as the random access procedure, the UE monitors the PDCCH according to the requirements of the corresponding operation.

In addition, the UE receiving a paging message as described above may perform the DRX to reduce the power consumption.

For this purpose, the network configures a plurality of paging occasions for each time period called a paging cycle, a specific UE receives paging messages only at the time of specific paging occasions, and the UE does not receive a paging channel except for the specific paging occasions. In addition, one paging occasion corresponds to one TTI.

Extended DRX (eDRX) is a function for extending a maximum of an existing paging DRX cycle of 2.56 ms to a maximum of several minutes to several tens of minutes in order to minimize power consumption of UE. The eDRX can be applied to an idle mode and a connected mode.

In the case of UE supporting eDRX mode, the state in which the UE is unreachable may mean the state in which the UE is unreachable by paging (i.e., a DRX duration in which the UE does not monitor a paging channel).

On the other hand, in the case of UE supporting eDRX mode, the state in which the UE is reachable may mean the state in which the UE is immediately reachable in ECM-CONNECTED mode and/or by paging (i.e., the interval in which the UE monitors a paging channel).

In other words, in eDRX mode, the UE may be determined to be temporarily unreachable even in an idle interval because DRX duration in eDRX mode is relatively longer than that in DRX mode. That is, in the case that common DRX (2.56 seconds) is supported, data delivery is available after a maximum of 2.56 seconds.

In the case that eDRX (e.g., 10 minutes) is applied, however, immediate data delivery is impossible because maximum delay is 10 minutes, which may be considered to be substantially unreachable.

An MME/SGSN may calculate the next paging occasion of the corresponding UE as below.

Paging for Extended Idle Mode DRX

A method for determining a paging occasion for a UE to which eDRX is applied is described below.

In the case that the extended idle mode DRX is applied to a UE, the UE is reachable by paging in a specific Paging Hyper-frame (PH).

The PH means a specific set of Hyper-System Frame Number (H-SFN) values. The PH may be calculated using an extended idle mode DRX cycle and a UE-specific ID (e.g., an IMSI).

An H-SFN frame structure is defined as the highest value of an SFN used for common idle mode DRX. That is, a single hyper-frame includes 1024 radio frames (i.e., 10.24 seconds). Accordingly, whenever the SFN is wrapped around, the H-SFN is increased by 1.

The value of an extended idle mode DRX cycle may be started from 5.12 seconds (i.e., 5.12, 10.24, 20.48 seconds, etc.) and increased up to a maximum of 2621.44 seconds (43.69 minutes) by two times.

The PH value may be calculated in all types of UE and the MME/SGSN(s) without any signaling. The MME/SGSN includes the length of an extended idle mode DRX cycle in a paging message in order to support that an eNB pages UE.

Furthermore, the MME/SGSN assigns the length of a Paging Time Window (PTW) (or a Paging Window (PW)) and provides the UE with a PTW length value along with the length of the extended idle mode DRX cycle during an attach and/or TAU procedure.

The first Paging Occasion (PO) of UE is included in a PH. It is assumed that the UE is reachable by paging during an additional PTW length after the first PO. After the PTW length, the MME/SGSN considers the UE to be unreachable by paging until a next PH.

An extended DRX (eDRX) cycle 'T_eDRX' may be configured in a UE by a higher layer (e.g., RRC layer). The UE may operate in eDRX mode only when a cell indicates that it supports the eDRX within system information.

When the T_eDRX cycle of UE is set as a 512 radio frame (i.e., 5.12 seconds), the UE applies 512 to a DRX cycle 'T' value and monitors a Paging Occasion (PO) defined according to Equations 1 and 2.

Otherwise, 'T' is determined to be a shorter value of a UE-specific DRX cycle (in the case that it is assigned by a higher layer) and a default paging cycle (a 'defaultPagingCycle' field value) broadcasted through system information. Furthermore, the UE in which eDRX mode has been set monitors a PO based on a previously determined 'T' value during a configured periodic paging window.

The paging window (i.e., PTW) is configured in a UE-specific manner and is determined by a Paging Hyper-frame (PH), a starting position 'PW_start' within the PH, and an ending position 'PW_ending' within the PH.

The PH, PW_start, and PW_end are determined as follows.

The PH is an H-SFN satisfying Equation 3 below.

$$H\text{-SFN} \bmod T_{eDRX,H} = (\text{UE\_ID} \bmod T_{eDRX,H}) \qquad \text{[Equation 3]}$$

In Equation 3, UE_ID denotes (IMSI mod 1024). T_eDRX, H is the eDRX cycle (T_eDRX, H=1, 2, ..., 256 hyper frame(s)) of a UE represented by a hyper-frame and is set by a higher layer.

The PW_start is the first radio frame of a PH, that is, part of a paging window and is a System Frame Number (SFN) satisfying Equation 4 below.

$$\text{SFN} = 256 * i_{eDRX} \qquad \text{[Equation 4]}$$

In Equation 4, i_eDRX=floor (UE_ID/T_eDRX,H) mod 4. In this case, floor (x) operation means a maximum integer not greater than "x".

The PW_end is the last radio frame of a paging window and is a System Frame Number (SFN) satisfying Equation 5 below.

$$SFN=(PW\_start+L*100-1) \bmod 1024 \quad \text{[Equation 5]}$$

In Equation 5, L is a paging window length (in second) set by a higher layer.

That is, a Paging Hyper-frame (PH) is configured in UE for each eDRX cycle (T_eDRX,H) (i.e., 5.12, 10.24, . . . , 2621.44 seconds) represented as a hyper-frame. Furthermore, a paging time window (or paging window) is configured from PW_start to PW_end within a PH. In addition, paging is monitored in a Paging Occasion (PO) (i.e., in the case that an eDRX cycle is 512 radio frames) calculated based on the eDRX cycle of UE within a configured paging window or a Paging Occasion (PO) (i.e., in the case that an eDRX cycle is not 512 radio frames) calculated based on a common DRX cycle and a default paging cycle.

As described above, the MME/SGSN may calculate the paging occasion of the corresponding UE. In this case, the MME/SGSN may assume that it has been synchronized with an eNB through loose synchronization 2.56 seconds or less.

The MME/SGSN may transmit an S1AP paging message along with a PTW value within a paging occasion calculated as described above so that the UE may receive paging reliably.

In this case, the PTW corresponds to the time corresponding to several times of common paging (a maximum 2.56 seconds). When receiving the PTW within the S1AP paging message, an eNB repeatedly transmits an RRC paging message to the UE at an interval of a common paging cycle (e.g., 1 second to 2 seconds) for a corresponding PTW time (e.g., 2 to 5 seconds) or for an internally set time in the case that it does not receive the PTW within the S1AP paging message.

Power Saving Mode

Power Saving Mode (PSM) is one of the 3GPP release-12 (rel-12) MTCe (Enhancement for MTC) features, and a function of minimizing power consumption of a UE by defining a duration in which the UE deactivates all of the Access Stratum (AS) operations such as paging reception and mobility management. In other words, a UE that supports the PSM may compromise with the network on the Active Time and periodic TAU timer or receive the Active Time and periodic TAU timer from the network during attach and tracking area update.

In the case that the UE receives the Active Time value from a network, when the UE is switched from the ECM-CONNECTED to the ECM-IDLE state, the UE receives a paging message by staying in the ECM-IDLE state during the corresponding Active Time period. Furthermore, when the Active Time period expires, the UE enters the PSM and deactivates all Access Stratum (AS) operations.

In addition, an MME initiates the Active timer by applying the Active Time value each time the UE enters ECM-IDLE mode. Furthermore, when the Active timer expires, the MME deduces that the UE is unreachable.

That is, the Active Time refers to the time period during which the UE supporting the state of using a power saving function (e.g., PSM) stays in the ECM-IDLE (or RRC_IDLE) state.

When the periodic TAU timer expires, the UE again enables the AS operation and performs the TAU, and the network stops the implicit detach timer of the corresponding UE. The UE may wake up anytime for a mobile-originated call (e.g., uplink data packet transfer).

Meanwhile, the UE wakes up at each P-TAU period and performs TAU to deal with Mobile terminated calls (e.g., Downlink Data packet receiving), performs the paging receiving operation during the received Active Time, and again enters the PSM mode to sleep.

An MME clears a Packet Proceed Flag (PPF) when the MME recognizes a UE enters the PSM. In the case that an S-GW receives Downlink packet data and there is no active S1-U connection of the corresponding UE, the S-GW transmits Downlink Data Notification (DDN) to the MME. However, in the case that the PPF is cleared, the MME notifies a rejection cause with respect to the corresponding DDN, and the S-GW that receives it discards the corresponding Downlink Packet Data. That is, in the case that an AS transmits Downlink Packet Data while the AS does not know whether to Sleep (i.e., whether to enter the PSM), the corresponding Downlink Packet Data is discarded in the S-GW, and the AS takes a retransmission operation since the AS is unable to receive the response to it.

For the smooth communication with an unreachable UE from an Application Server and so on for a long time like the PSM, currently, the Study on a High Latency communication (HLcom) has been progressed with Release 13. The HLcom (refer to document TR 23.709) has proposed a method of a transmission after identifying a Reachability of a UE at S-GW buffering solution and AS terminals in order to control unnecessary retransmission at an Application Sever terminal.

Currently, the extended Discontinuous Reception (eDRX) has been under discussion again, which was one of the technical candidates for the UE low power consumption except the PSM. The DRX, referring to a Paging transmission period of a UE in an idle mode, defines 260 ms as the maximum value in the current E-UTRAN system. The C-DRX used in a connected mode in Release 8 is not dealt with in the present specification. The eDRX defines a transmission period greater than the existing 260 ms. The eDRX makes a UE have longer sleep period, and thus, wants to obtain greater Power Saving effect. Currently, in the work item description (WID) for the Study on 3GPP RAN2, it is targeted to set the eDRX to a few minutes and to tens of minutes largely.

Inter-MME Mobility

In the aforementioned downlink data buffering solution within the S-GW, if the UE applies a long-term power saving function, the possibility that the mobility of the UE may occur within the power saving application time may be expected. In this case, an MME change and an S-GW change need to be taken into consideration. That is, whether a packet buffered in an old S-GW must be transferred to a new S-GW needs to be discussed. The above solution has proposed a procedure, such as that of FIG. 16 below, with respect to the situation in which the S-GW is changed.

FIG. 16 illustrates a tracking area update procedure accompanied by an S-GW change in a wireless communication system to which the present invention may be applied.

FIG. 16 illustrates the case of an inter-MME TAU procedure.

1-3. If the TAU timer of a UE in the ECM-IDLE state elapses or moves to another tracking area, a TAU procedure for reporting a tracking area (TA) to an MME is triggered.

The UE starts the TAU procedure by transmitting a TAU request message to the MME.

The TAU request message is included in an RRC Connection Setup Complete message in RRC connection and delivered, and is included in an initial UE message in SI signaling connection and delivered.

4. If the MME that has received the TAU request message is different from an old node (i.e., MME or SGSN) (i.e., if the MME is changed), a new MME transmits a Context Request message to the old MME/SGSN in order to obtain information of the UE from the old MME/SGSN.

5. When the Context Request message is transmitted to the old MME/SGSN, the old MME/SGSN transmits a Context Response message as a response.

In this case, if the old MME/SGSN indicates whether DL data forwarding is requested (i.e., if required, "DL data forwarding required") for the new MME (the SGSN in the case of an RAU procedure).

6. The UE and the new MME and the HSS perform an authentication function and a security (or ciphering procedure.

The new MME determines whether the S-GW will be relocated. If the old S-GW no longer provides service to the UE, the S-GW is relocated. Furthermore, if a new S-GW provides service to the UE for a long time and/or it is expected that a P-GW path is more suitable for the UE or the new S-GW is co-located with the P-GW, the new MME may determine the relocation of the S-GW.

7. If the MME selects the new S-GW, the MME transmits a Create Session Request message to a new S-GW selected for each PDN connection.

In this case, if the new MME (the SGSN in the case of the RAU procedure) receives "DL data forwarding required" in step 5, the new MME (the SGSN in the case of the RAU procedure) requests the new S-GW to assign a new S-GW temporary IP address (IP@) and TEID for DL data forwarding by delivering "DL data forwarding required" to the new S-GW.

8. If necessary, the new S-GW transmits a Modify Bearer Request message to the P-GW for each PDN connection.

9a. If necessary, the P-GW may perform an IP connectivity access network (IP-CAN) session modification procedure with a PCRF.

9. When the P-GW receives the Modify Bearer Request message from the new S-GW, it transmits a Modify Bearer Response message to the new S-GW as a response thereto.

10. The new S-GW updates its own bearer context. Accordingly, the new S-GW may route a bearer PDU to the P-GW when it receives the bearer PDU from an eNB.

The new S-GW transmits a Create Session Response message to the new MME as a response to a Create Session Request.

In this case, the new S-GW delivers the temporary IP address (IP@) and TEID assigned for DL data forwarding to the new MME through the Create Session Response message.

11. The new MME transmits a Context Acknowledge message to the old MME/SGSN.

If the MME selects the new S-GW, the MME delivers change indication information of the S-GW to the old MME/SGSN through the Context Acknowledge message. The change indication information of the S-GW indicates that the new S-GW has been selected.

In this case, the new MME delivers the temporary IP address (IP@) and TEID assigned for DL data forwarding to the old MME/SGSN through the Create Session Response message.

12. The new MME transmits an Update Location Request message to the HSS.

13. The HSS transmits a Cancel Location message to the old MME/SGSN.

14. The old MME/SGSN transmits a Cancel Location Acknowledge message to the HSS as a response to the Cancel Location message.

15. If the old SGSN receives the Context Acknowledge message and connected to the UE through an Iu interface, the old SGSN transmits an Iu Release Command message to an RNC.

16. The RNC transmits an Iu Release Complete message to the old SGSN as a response to the Iu Release Command message.

17. The HSS transmits an Update Location Acknowledge message to the new MME as a response to the Update Location Request message.

18. If the S-GW change indication is received within the Context Acknowledge message in step 11, the old MME/SGSN releases the MME or SGSN EPS bearer resources by transmitting a Delete Session Request message to the old S-GW.

In this case, the old MME/SGSN delivers the temporary IP address (IP@) and TEID assigned for DL data forwarding to the old S-GW through the Delete Session Request message.

19. The old S-GW transmits the Delete Session Response message to the old MME/SGSN as a response to the Delete Session Request message.

20. The new MME transmits a TAU Accept message to the UE. In this case, if the new MME has assigned a new globally unique temporary identity (GUTI) to the UE, the assigned GUTI may be included in the TAU Accept message.

21. If the GUTI is included in the TAU Accept message, the UE transmits a TAU Complete message to the MME as a response to the TAU Accept message.

22. The old S-GW transfers a buffered DL packet to the new S-GW and transmits an End Marker packet, indicating that there is no more data to be delivered, to the new S-GW.

Machine-Type Communication (MTC)

FIG. 17 is a diagram exemplifying a Machine-Type Communication (MTC) architecture in a wireless communication system to which the present invention may be applied.

A UE used for the MTC (or an MTC UE) and an end-to-end application between MTC applications may use services provided by a 3GPP system and selective services provided by the MTC server. The 3GPP system may include transmission and communication services (including a 3GPP bearer service, an IMS, and an SMS) including various optimizations for facilitating the MTC.

It is shown in FIG. 17 that the UE used for the MTC is connected to a 3GPP network (e.g., UTRAN, E-UTRAN, GERAN, I-WLAN, etc.) through an Um/Uu/LTE-Uu interface. The architecture of FIG. 16 includes various MTC models (e.g., a direct model, an indirect model, and a hybrid model).

Entities shown in FIG. 17 are now described.

In FIG. 17, an application server is a server on a network on which an MTC application is executed. The aforementioned various techniques for implementing the MTC applications may be applied to the MTC application server and a detailed description thereof will be omitted. In addition, in FIG. 16, the MTC application server may access the MTC server through a reference point API, and a detailed description thereof will be omitted. Alternatively, the MTC application server may be collocated with the MTC server.

The MTC server (e.g., an SCS server shown in FIG. 16) is a server on a network for managing an MTC UE, and may be connected to a 3GPP network to communicate with a UE used for MTC and nodes of PLMN.

An MTC-InterWorking Function (MTC-IWF) may control interworking between an MTC server and an operator core network, and may play a role of a proxy of an MTC action. In order to support the MTC indirect or hybrid model, the MTC-IWF may relay or interpret a signaling protocol on a reference point Tsp to operate a specific function in the PLMN. The MTC-IWF may perform a function for authenticating an MTC server before the MTC server establishes communication with a 3GPP network, a function for authenticating a control plane request from the MTC server, various functions related to a trigger indication, and so on.

An SMS-SC (Short Message Service-Service Center)/IP-SM-GW (Internet Protocol Short Message GateWay) may manage transmission/reception of a Short Message Service (SMS). The SMS-SC may relay a short message between a Short Message Entity (SME) (i.e., an entity for transmitting or receiving a short message) and a mobile station and may serve for a storing-and-delivering function. The IP-SM-GW may serve for a protocol interaction between an IP-based UE and the SMS-SC.

A CDF (Charging Data Function)/CGF (Charging Gateway Function) may perform an accounting related action.

An HLR/HSS may perform a function for storing subscriber information (e.g., IMSI, etc.), routing information, configuration information, and so on, and for providing it to the MTC-IWF.

An MSC/SGSN/MME may perform a control function such as mobility management, authentication, resource allocation, and so on, for network connection of the UE. Regarding triggering, a function for receiving a trigger indication from the MTC-IWF and for processing it in a form of a message provided to the MTC UE may be performed.

A GGSN (Gateway GPRS Support Node)/the S-GW (Serving-Gateway)+the P-GW (Packet Data Network-Gateway) may perform a function of a gateway which serves for connection of a core network and an external network.

Table 7 below is a summary of an important reference point in FIG. 17.

TABLE 7

| Reference point | Description |
|---|---|
| Tsms | Reference point used by an entity outside the 3GPP system to communicate with an MTC through an SMS |
| Tsp | Reference point used by an entity outside the 3GPP system to communicate with the MTC-IWF related control plane signaling |
| T4 | Reference point used by the MTC-IWF to route device trigger to the SMS-SCin the HPLMN |
| T5a | Reference point used between the MTC-IWF and the serving SGSN |
| T5b | Reference point used between the MTC-IWF and the serving the MME |
| T5c | Reference point used between the MTC-IWF and the serving MSC |
| S6m | Reference point used by the MTC-IWF to interrogate the identification information of UE(E.164 MSISDN (Mobile Station International Subscriber Directory Number) or external identifier mapping to IMSI) and gather UE reachability and configuration information |

At least one of the reference points T5a, T5b, and T5c in Table 7 is referred to as T5.

Meanwhile, user plane communication with the MTC server in case of the indirect and hybrid model and communication with the MTC application in case of the direct and hybrid model may be performed by using the existing protocol through reference points Gi and SGi.

The 3GPP TS 23.682 document may be incorporated by reference for details of the description of FIG. 17.

FIG. 18 illustrates architecture for service capability exposure in a wireless communication system to which the present invention may be applied.

The architecture for service capability exposure illustrated in FIG. 18 enables a 3GPP network to safely expose its own services and capabilities, provided by a 3GPP network interface, to an external 3rd party service provider application.

A Service Capability Exposure Function (SCEF) is a core entity within 3GPP architecture for service capability exposure which provides means for safely exposing services and capabilities provided by a 3GPP network interface. In other words, the SCEF is a core entity for providing a service function belonging to a trusted domain operated by a mobile communication operator. The SCEF provides an API interface to a 3rd party service provider and provides service functions of 3GPP to a 3rd party service provider through connection with various entities of 3GPP. The SCEF may be provided by an SCS.

In the case that the Tsp function is able to be exposed through an Application Program Interface (API), the MTC-IWF and the SCEF may be co-located. A protocol (e.g., DIAMETER, RESTful APIs, or XML over HTTP) for specifying a new 3GPP interface based on multiple factors is selected. In this case, the multiple factors require the ease of exposure of requested information or a specific interface, but are not limited thereto.

Monitoring enhancements (MONTE) means an item for providing a convenience function in which a 3rd party MTC operator may remotely monitor its own MTC UE. That is, when the 3rd party service provider registers a required monitoring event with the SCEF through the application server, the SCEF may report whether an event has occurred to the AS when the corresponding event is generated.

In 3GPP, the following monitoring events for MTC monitoring are defined.

1) The roaming status and serving network of UE
2) The location of UE
3) A change in the association of an MTC Device and a Universal IC Card (UICC)
4) A loss of connectivity
5) UE reachability
6) Communication failure
7) Reporting the number of pieces of UE present in a certain area Particularly, in the case of reporting the number of UEs present in a certain area, as Monitoring solution through MME/SGSN and HSS, the monitoring is configured with respect to the corresponding UE as described above, and the monitoring result of the monitoring event may be reported.

In 3GPP TR 23.789, it is defined for the Reporting the number of UEs present in a certain area, as below.

Monitoring event: Reporting the number of UEs present in a geographic area

When it is requested for generating onetime report for UE(s) located in a geographic area, the SCEF is mapped to the cell(s) in the geographic area and/or the list of RA(s)/TA(s), and identifies the MME(s)/SGSN(s) that service the corresponding cell(s) and/or RA(s)/TA(s).

In order to count the UE(s) in such cell(s) and/or RA(s)/TA(s), the SCEF requests to such MME(s)/SGSN(s) through a new direct interface.

SCS/AP (i.e., Application Service Provider (ASP)) specifies.

Mapping of the serving operator (i.e., Mobile Network Operator (MNO)) network list of a specific geographic area and cell(s) and/or RA(s)/TA(s), and the identifier of the related serving node (i.e., MME(s)/SGSN(s)) are configured in the SCEF.

In the case that the list includes the cell(s) and the request is a request for the lastly known location, the MME(s)/SGSN(s) collect all UEs in which the lastly known location indicates the corresponding cell(s). In the case that the list includes the RA(s)/TA(s), the MME(s)/SGSN(s) collect all UEs registered in the corresponding RA(s)/TA(s).

In the case that the list includes the cell(s) and the request is a request for the current location, the MME(s)/SGSN(s) perform paging in the cell(s) in order to identify the unconnected UE(s) already.

For the connected UE(s) already, in order to receive the current cell of the UE, the MME(s)/SGSN(s) query to the RAN. The MME(s)/SGSN(s) report the counting result to the SCEF. The SCEF combines the report from all of the involved MME(s)/SGSN(s), and report the total summation to the SCS(Services Capability Server)/application server (AS).

Cell Selection and Reselection Procedure

The cell selection/reselection procedure of an MS is described in more detail below.

1. Cell Selection Procedure (1) Initial Cell Selection

Cell selection may be performed when an MS is powered on or a proper cell is not searched for by a cell reselection procedure. A common initial cell selection procedure may be performed as follows.

First, an MS may perform a cell search procedure for one carrier frequency. This is for searching for all of cells of the corresponding frequency. Next, the MS may perform cell measurement on each cell in order to search for the strongest cell of the cells of the corresponding carrier frequency.

Second, the MS may read system information for the strongest cell of the corresponding carrier frequency. If the corresponding cell is a proper cell, the MS may attempt camping on the corresponding cell.

If the MS successfully camps on the corresponding cell, the MS may stop the search for other carrier frequencies. If not, the MS may need to sequentially search for the next strongest cell of the carrier frequency.

(2) Storage of Cell Selection Information

If an MS has stored information about a specific cell, the MS does not need to perform an operation from the initial cell selection procedure and instead may perform a cell selection procedure using the stored information. If a proper cell according to the stored information is not searched for, the initial cell selection procedure may be started.

2. Cell Reselection Procedure

While camping on a cell is performed, the MS may search for a better cell based on a measurement rule. If a better cell is searched for according to a cell reselection criterion, the corresponding cell may be selected.

Measurement for cell reselection may include both a serving cell and a neighbor cell.

Measurement for a serving cell

If a PSM is used, measurement for a serving cell may be performed when an MS wakes up. If DRX/paging is used, measurement in a legacy mechanism may be performed for each paging period.

Measurement for a neighbor cell

In order to reduce power consumption of an MS, measurement for a neighbor cell does not need to be periodic. Instead, the MS may start neighbor cell measurement if the received signal level of a serving cell is smaller than a threshold or if the MS has failed in some times of decoding.

After the MS performed the measurement of the neighbor cell, the MS may assign priority to all of cells and may read essential system information of a cell ranked at the top. If the corresponding cell is a cell on which camping is suitable and satisfies the following reselection conditions, the MS may reselect the corresponding cell.

If the new cell is ranked higher than a serving cell during a T_reselection (measured time if the MS needs to measure a serving cell and a neighbor cell) time interval, the timer value (T_reselection) is broadcasted as system information.

If the MS has camped on a current serving cell for a defined period/time

If the highest cell is not a proper cell, the MS may select the second highest cell (i.e., a cell ranked next to the highest cell).

Cellular Internet of Things (CIoT)

The cellular IoT (CIoT) means the IoT using a cellular radio communication technology (e.g., 3GPP technology). Furthermore, the CIoT RAT means a radio access technology supporting the CIoT.

The evolution of a radio access network (RAN) and the evolution of a core network (CN) for CIoT service are being discussed together.

In the case of the RAN, two types of CIoT are being discussed. One of them is a GERAN evolution solution (e.g., extended coverage-GSM (EC-GSM), and the other of them is a new radio access network form. A clean slate solution (e.g., a narrow band CIoT or NB-LTE) is being discussed as the new radio access network form.

CIoT EPS optimization supports improved small data delivery. One optimization is based on the user plane transport of user data and is referred to as user plane CIoT EPS optimization. Another optimization called control plane CIoT EPS optimization delivers user data through the MME by encapsulating the user data in an NAS packet data unit (PDU). Accordingly, when a short data transaction is performed, a total number of control plane messages can be reduced. CIoT data includes, for example, status information and measurement data generated from an M2M application.

CIoT EPS optimization is designed to support both a narrow band (NB)-IoT RAT and MTC category M1, but an individual RAT may be separately processed. That is, the MME/NAS may perform different processing depending on that a UE is served through which RAT.

In the case of the cellular Internet of Things (CIoT) now discussed in Rel-13, unlike an MTC UE of Rel-13 using the existing MBMS technology, group message delivery cannot be supported using MBMS.

In accordance with the item g) of overall architecture required requirements of TR 45.820 below, it has been stipulated that a CIoT UE cannot use a broadcast transmission method, such as MBMS.

All of architecture required conditions (TR 45.820)

The following contents may be requested for a cellular system for supporting an ultralow complexity and low throughput IoT (Cellular IoT) independent of the selection of a radio access solution.

a) Core network (CN) features present to reduce energy consumption of a UE must be reused (e.g., PSM of Rel-12 and the long period RAU/TAU timer of Rel-10)

b) Network sharing is supported (full-multi-operator core network (MOCN) and gateway core network (GWCN))

c) A mechanism for controlling MTC device access based on the PLMN is supported (e.g., corresponding to a present PLMN-specific access class barring mechanism).

d) Short message service (SMS) is supported e) IP header compression for IP-based service is supported.

f) Mobility (preparation/connection and both in standby/idle states) is supported based on an MS-automatic cell selection/reselection. Network control mobility is not required along with MC measurement report.

g) A broadcasted mechanism must be subsequently supported (e.g., the support of MBMS, PWS and cell broadcast service (CBS)). However, in the current release, broadcasting support is not requested. Support for a low delay warning, such as ETWS, is not required.

h) If it is based on Gb architecture, the future introduction of an operation and maintenance (O&M) procedure corresponding to an S1 setup procedure needs to be supported.

(In addition, whether it is necessary for the access support of an MME/SGSN level without the evaluation of energy consumption efficiency of Gb and S1 based on architecture options and PDN connection activation needs to be subsequently discussed.)

However, the SCS/AS that is a $3^{rd}$ party service providing stage may still attempt to transmit a message to a CIoT UE based on a group. In particular, in the case of the triggering and/or software upgrade of a specific procedure, it is much easy and convenient for the SCS/AS to transmit a message to a group unit rather than to transmit a message to many UEs belonging to the same group one by one.

Accordingly, this specification proposes a group message delivery method for a CIoT UE that does not support a broadcast communication method, such as MBMS and CBS. The group message delivery method proposed in this specification may be effectively applied if a UE performs a consumption power saving function, such PSM and/or eDRX. Furthermore, the group message delivery method proposed in this specification may also be applied to a case where a service exposure framework for MONTE and GROUPE of PP Rel-13 is used.

Group Message Delivery Method—Transmission of Infrequent Small Data to Group of UEs Using SCEF Group message delivery is an essential function for an efficient CIoT in terms of resource optimization and management convenience for a $3^{rd}$ party service provider. However, as described above, the first release of the CIoT radio access technology (RAT) does not support the MBMS function. Accordingly, this specification proposes an alternative mechanism for group message delivery to a CIoT UE that does not support a broadcast communication method, such as MBMS.

A solution proposed in this specification may be used for transmission from the SCS/AS to the MME using a service exposure framework. Furthermore, unicast transmission using a control plane path from the MME to a UE is assumed.

In this specification, two transport modes are proposed as solutions. A group message request message transmitted/received in the transport mode may indicate an immediate delivery parameter. In this case, the immediate delivery parameter may represent a parameter value indicating whether a group message will be immediately delivered.

In one embodiment (or as a first transport mode), if the MME has not received a request for immediate delivery from the SCS/AS ($3^{rd}$ party service provider), the MME may transmit a group message to a UE connected thereto when the UE is connected to the MME for the mobile originated (MO) purpose. Accordingly, according to the present embodiment, there is an advantage in that an additional service request procedure for group message delivery is not separately required.

Furthermore, according to the present embodiment, if the SCS/AS sets a validity time value, that is, a group message storage/providing/buffering time value of the MME, as a periodic TAU time value (or a P-TAU timer value), reliability that a group message stored in the MME can be delivered to all of UEs belonging to a UE if a UE performs a period TAU procedure at least can be secured.

In another embodiment, (or as a second transport mode), if the MME has received a request for immediate delivery from the SCS/AS, the MME may transmit paging to a UE in order to deliver a group message. In this case, the MME may transmit paging to the UE to which (extended) idle mode DRX is being applied. In accordance with the present embodiment, unlike in the previous embodiment (or the first transport mode), an additional service request procedure is required for group message delivery in addition to the MO call process.

Hereinafter, the aforementioned embodiments are described in more detail with reference to respective flowcharts.

FIGS. 19 and 20 are flowcharts regarding a group message delivery method according to an embodiment of the present invention. In particular, FIG. 19 is a flowchart regarding an embodiment if the SCS/AS has not indicated the immediate delivery of a group message, and FIG. 20 is a flowchart regarding an embodiment if the SCS/AS indicates the immediate delivery of a group message. Hereinafter, step S1910 to step S1940 are substantially the same as step S2010 to step S2040, and thus the corresponding steps are described with reference to the two flowcharts at the same time. However, the operation methods are different from step S1950 and step S2050 depending on the embodiments, and thus the corresponding steps are individually described with reference to the flowcharts.

Referring to FIGS. 19 and 20, first, the SCS/AS may transmit a first group message request message to the SCEF (S1910, S2010). In this case, an external group ID, an SCS/AS ID, delivery content, a validity time and/or an immediate delivery parameter may have been included in the first group message request message transmitted by the SCS/AS.

In this case, the external group ID may correspond to ID information of a target delivery group to which the SCS/AS wants to deliver a group message, the SCS/AS ID may correspond to ID information of the SCS/AS that has transmitted the group message request message, the delivery content may correspond to group content/data/message to be delivered in common from the SCS/AS to the target delivery group, the validity time may correspond to the time during which the MME buffers/stores the delivery content in order to provide the delivery content to a UE, and the immediate delivery parameter may correspond to a parameter indicating whether the MME will immediate deliver the delivery content to a UE belonging to the target delivery. In this specification, the delivery content may be referred to as a group message.

In this step, the SCS/AS may determine the IP address (s)/port(s) of the SCEF to which the first group message request message will be transmitted by performing a domain name system (DNS) question using an external group ID or a locally configured SCEF ID/address.

Next, the SCEF may confirm whether the SCS/AS has the right to transmit the group message (S1920, S2020). More specifically, the SCEF may determine whether the corresponding SCS/AS has the right to transmit the group message using the SCS/AS ID included in the first group message request message.

If it is determined that the SCS/AS does not have the right to transmit the group message (or if confirming the right fails), the SCEF may transmit a Group Message Check message to the SCS/AS along with a reason value indicative of failure conditions/reason (or failure reason), and may no longer perform a next step (S1930, S2030). In contrast, if it is determined that the SCS/AS has the right to transmit the group message, the SCEF may perform a next step (S1930, S2030).

Next, the SCEF that the SCS/AS has determined to have the right to transmit the group message may transmit a group information request message to the HSS (S1930, S2030). In this case, the external group ID, SCS ID and/or immediate delivery parameter received through the first group message request message from the SCEF may have been included in the group information request message.

In this case, the SCEF may receive related routing information (including the ID of a serving core network (CN) node, etc.) stored in the HSS as a response to the group information request message. If the immediate delivery parameter received by the HSS indicates the immediate delivery of the group message, the IMSI of UEs belonging to each target delivery group may be additionally requested from the HSS (i.e., the HSS may additionally transmit the IMSIs of the UEs belonging to the target delivery group if indication for the immediate delivery of the group message is received).

More specifically, next, the HSS may resolve the external group ID (S1940, S2040). The HSS may determine an internal group ID corresponding to the external group ID received from the SCS/AS. In this case, the internal group ID is the ID of a group to which each UE belongs, and may refer to a group ID that is internally used for the MME to identify each group. If the immediate delivery parameter value received by the HSS has been set to indicate the immediate delivery of the group message (i.e., if the immediate delivery has been set), the HSS may additionally determine/confirm an individual group member/IMSIs of UEs belonging to the target delivery group.

The following steps are differently performed depending on the flowcharts of FIGS. 19 and 20, and thus embodiments are separately described for each flowchart.

1. Option A—if the immediate delivery of the group message is not provided

Referring to FIG. 19, as a next step for step S1940 if the immediate delivery of the group message is not provided, the HSS may transmit a group information response message to the SCEF (S1950). In this specification, the case where the immediate delivery of the group message is not provided may be expressed as a case where the immediate delivery of the group message has not been set, a case where the immediate delivery parameter value is not set to "1" or a case where the SCS/AS does not indicate the immediate delivery of the group message.

In this case, serving CN node information (or a serving CN node list) and/or an internal group ID may have been included in the transmitted group information response message. In this case, the serving CN node information (or serving CN node list) may refer to information or a list regarding serving CN nodes (e.g., MME) to which the target delivery group to which the SCS/AS wants to transmit the group message belongs (or camps on).

Next, the SCEF may transmit a second group message request message to the MME(s) (S1960). More specifically, the SCEF may determine at least one MME to which the target delivery group belongs based on the group information response message received at step S1950, and may transmit a second group message request message to the corresponding MME. In this case, the (internal) group ID, SCS/AS ID, delivery content, validity time and/or immediate delivery parameter may have been included in the transmitted second group message request message. In this case, the immediate delivery parameter may have been set as a value (e.g., "0") not indicating immediate delivery.

Next, if the IMSI of UEs belonging to the target delivery group are not included in the second group message request message received by the MME and/or the immediate delivery parameter included in the second group message request message does not indicate immediate delivery, the MME may transmit delivery content to a corresponding UE when it is connected to the UE belonging to the target delivery group (S1970).

More specifically, if the MME does not receive the IMSI of UEs belonging to the target delivery group through the second group message request message and/or has not received indication for immediate delivery, the MME may have buffered/stored delivery content during the validity time. In this case, when the MME detects that a UE belonging to the target delivery group enters a connection mode with the MME by a TAU and/or mobile-originated call within the validity time, it may confirm the (internal) group ID of the corresponding UE. If the (internal) group ID of the corresponding UE is identical with the (internal) group ID included in the second group message request message, the MME may unicast the delivery content buffered therein to the corresponding UE. In this case, the MME may transmit the delivery content through an NAS PDU.

In this specification, the case where the UE and the MME are connected (or when entry into the connection mode is detected) may correspond to a case where a signal connection between the UE and the MME is established. More specifically, a case where a signal connection is established between the UE and the MME because a first NAS message (or NAS PDU) that starts transition from the ECM-Idle state to the ECM-Connection state, such as an Attach Request message, a tracking area update request message, a service request message or a release request message, is transmitted may express that the UE and the MME have been connected.

Finally, the UE may start communication with the SCS/AS immediately or subsequently in response to the received delivery content (S1980).

Option A has an effect in that the SCS/AS can transmit the group message to the UE connected to the MME during the validity time through one group message delivery even without a separate additional connection setup procedure for group message delivery. In particular, the MME does not need to perform a separate user plane setup procedure along with the UE because it transmits delivery content/data through an NAS PDU in the control plane. Furthermore, the MME does not need to separately perform a paging procedure in order to transmit the group message. Furthermore, there are effects in that the number of times (or frequency) that the UE wakes up is reduced because the UE does not need to additionally wake up in order to receive the group message and power consumption is reduced because the IDLE mode of the UE is maintained long.

In the present flowchart, if indication for the immediate delivery of the group message is not received, the HSS does not separately provide the IMSI of UEs belonging to the target delivery group, but the present invention is not limited thereto. Although indication for the immediate delivery of the group message has been received, the HSS may provide the IMSI of UEs belonging to the target delivery group for the following purposes.

The HSS may provide the IMSI of UEs belonging to the target delivery group to the SCEF/MME for the purpose of individually checking whether the UE has received the group message. For example, when the MME is connected to a UE within a validity time, it may confirm the IMSI of the connected UE in addition to the (internal) group ID of the corresponding UE. In this case, if the connected UE is a UE belonging to the target delivery group, the MME may transmit the delivery content buffered/stored therein to the corresponding UE, and may indicate/mark that the delivery content has been (successfully) delivered to the corresponding UE using the IMSI of the corresponding UE.

As described above, the MME individually checks whether a group message has been delivered to each UE using the IMSI of the UE in order to prevent the redundant delivery of the group message to the same UE, and reports the IMSI of a UE that has not received the group message within a validity time to the SCS/AS so that the group message is separately retransmitted to the corresponding UE again subsequently.

As described above, if the IMSI is received in order to check whether the UE has received the group message (or whether the group message has been successfully received), the MME does not determine whether the group message will be immediately delivered depending on whether the IMSI has been included in the second group message request message received at step S1960, and determines whether the group message will be immediately delivered based on the immediate delivery parameter.

2. Option B—if Immediate Delivery is Provided

Referring to FIG. 20, as a next step for step S2040 if the immediate delivery of the group message is provided, the HSS may transmit a group information response message to the SCEF (S2050). In this specification, the case where the immediate delivery of the group message is provided may be expressed as a case where the immediate delivery of the group message has been set, a case where the immediate delivery parameter value is set to "1" or a case where the SCS/AS indicates the immediate delivery of the group message.

In this case, serving CN node information (or a serving CN node list), an internal group ID and/or the IMSI(s) of UEs (or an IMSI(s) list) included in the target delivery group may have been included in the transmitted group information response message.

Next, the SCEF may transmit a second group message request message to the MME(s) (S2060). More specifically, the SCEF may determine at least one MME belonging to the target delivery group based on the group information response message received at step S2050 and transmit the second group message request message to the corresponding MME. In this case, an (internal) group ID, an SCS/AS ID, delivery content, a validity time, an immediate delivery parameter and/or the IMSI of UEs belonging to the target delivery group(s) may have been included in the transmitted second group message request message. In this case, the immediate delivery parameter may have been set as a value (e.g., "1") indicating immediate delivery.

Next, if the IMSI of UEs belonging to the target delivery group have been included in the second group message request message received by the MME and/or if the immediate delivery parameter included in the second group message request message indicates immediate delivery, the MME may transmit a paging message to a UE (in particular, a UE to which DRX/eDRX is being applied) corresponding to the received IMSI (S2070).

More specifically, if the MME receives the IMSI of UEs belonging to the target delivery group through the second group message request message and/or receives indication for immediate delivery, the MME may perform a paging procedure for waking corresponding UEs up from the Idle mode so that the group message can be immediately transmitted to the corresponding UEs (or the UEs belonging to the target delivery group) corresponding to the received IMSI. The paging procedure has been described above in detail with reference to FIG. 14.

When the UE woke up from the Idle mode according to the paging procedure is connected to the MME, the MME may unicast the delivery content, received through the second group message request message, to the UE. In this case, the MME may deliver the delivery content through an NAS PDU.

In this specification, the case where the UE and the MME are connected (or when entry into the connection mode is detected) may correspond to a case where a signal connection between the UE and the MME is established. More specifically, a case where a signal connection is established between the UE and the MME because a first NAS message (or NAS PDU) that starts transition from the ECM-Idle state to the ECM-Connection state, such as an Attach Request message, a tracking area update request message, a service request message or a release request message, is transmitted may express that the UE and the MME have been connected.

Finally, the UE may start communication with the SCS/AS immediately or subsequently in response to the received delivery content (S2080).

In the case of Option B, a separate additional paging procedure is required compared to Option A and frequency that a UE wakes up may increase. However, there is an advantage in that whether a group message has been (successfully) delivered to each UE (or whether a group message has been successfully received) can be checked because the IMSI(s) of UEs belonging to a target delivery group are received. Furthermore, there is an effect in that a group message can be rapidly delivered because a paging message is transmitted to a UE to which DRX/eDRX is being applied in order to immediate transmit the group message.

The unicast transmission mechanism has been described in detail in Option A and Option B, but message delivery using the control plane may be taken into consideration.

FIG. 21 is a flowchart regarding a group message delivery method when an MME moves according to an embodiment of the present invention.

In the present flowchart, it is assumed that the SCS/AS does not indicate the immediate delivery of a group message (i.e., Option A is applied). It is assumed that while a first MME buffers a group message for a first UE (i.e., within a validity time), the serving location of the first UE moves from the first MME (old MME) to a second MME (new MME). In other words, the serving CN of the first UE changes from the first MME to the second MME within the validity time of group message delivery.

First, the first MME may receive a group message request message from the SCEF (S2110). This step corresponds to step S1960 of FIG. 19, and a redundant description thereof is omitted.

Next, the first UE may transmit a TAU request message to the second MME (S2120). More specifically, the first UE may be connected to a new eNB due to a location movement. If the new eNB is served by the second MME, the first UE may transmit the TAU request message to the second MME for a connection with the second MME (i.e., MME relocation). In this case, a globally unique temporary identity (GUTI) (or S-TMSI) assigned to the first UE may have been included in the TAU request message.

Next, the second MME may transmit a context request message to the first MME (S2130). More specifically, the second MME may transmit the context request message to the first MME in order to request the MM context of the first UE. In this case, the GUTI of the first UE included in the TAU request message and received may have been included in the transmitted context request message.

Next, the first MME may determine whether the first UE is the subject of group message delivery using the GUTI (or S-TMSI) of the first UE obtained through the received context request message (S2140). More specifically, when the first MME receives the context request message from the second MME within a validity time, it may check the GUTI within the received context request message. The first MME may obtain the (internal) group ID of the first UE by checking the (internal) group ID corresponding to the corresponding GUTI within the stored MM context of the first UE. The first MME may determine whether the first UE belongs to a target delivery group by comparing the obtained (internal) group ID with the (internal) group ID of the target delivery group received through the group message request message.

If the group ID of the first UE is not the group ID of the target delivery group, the first MME may transmit a context response message, including the mobility management (MM) context of the first UE, to the second MME (not shown). In contrast, if the corresponding group ID is the group ID of the target delivery group, the first MME may perform next step S2150.

Next, the first MME may transmit a context response message, including the MM context of the first UE and delivery content, to the second MME (S2150). More specifically, if it is checked that the first UE belongs to the target delivery group as described above, the first MME may include the delivery content, buffered/stored in order to be transmitted to the target delivery group, in the context response message along with the MM context of the first UE, and may transmit the context response message to the second MME.

Finally, the second MME that has received the context response message may transmit a TAU accept message, including the delivery content, to the UE (S2160), but the present invention is not limited thereto. The delivery content may be transmitted to the first UE through a separate message other than the TAU accept message.

According to the present flowchart, there is an effect in that there is provided a reliable group message delivery mechanism by which the UE can stably receive a group message although the MME providing service is changed.

Meanwhile, although not shown in the present flowchart, if the first MME receives the group message request message additionally including the IMSI of UEs included in the target delivery group from the SCEF, at step S2140, the first MME may additionally check whether the delivery content has already been delivered to the first UE. If the first MME checks that the delivery content has already been transmitted to the first UE, the first MME may transmit a context message, including only the MM context of the first UE, to the second MME although the first UE belongs to the target delivery group. In contrast, if the first MME checks that the delivery content has not yet been transmitted to the first UE, it may perform step S2150 as long as the first UE belongs to the target delivery group.

FIG. 22 is a diagram showing an operating flowchart of a first MME according to an embodiment of the present invention.

In the present flowchart, the embodiment of FIG. 19 has been written in more detail from the viewpoint of the MME, and a description redundant with that of FIG. 19 is omitted.

Referring to FIG. 22, first, the first MME may receive a group message request message (S2210). More specifically, the first MME may receive the group message request message indicating/instructing group message delivery from the SCEF. In this case, an (internal) group ID, an SCS/AS ID, a delivery content, a validity time and/or an immediate delivery parameter may have been included in the transmitted group message request message. In this case, the immediate delivery parameter may have been set as a value (e.g., "0") not indicating immediate delivery.

Next, the first MME may detect a first UE connected thereto (S2220). More specifically, the first MME may detect that the first UE belonging to a target delivery group enters a connection mode with the MME due to a TAU and/or mobile-originated call within a validity time.

Next, the first MME may check the (internal) group ID of the detected first UE (S2230). If the (internal) group ID of the first UE is identical with the (internal) group ID included in the group message request message, the MME may (unicast) transmit delivery content buffered therein to the first UE (S2240). In this case, the MME may transmit the delivery content through an NAS PDU.

In the present flowchart, if indication for the immediate delivery of a group message is not received, the HSS does not separately provide the IMSI of UEs belonging to a target delivery group, but the present invention is not limited thereto. Although indication for the immediate delivery of a group message has been received, the HSS may provide the IMSI of UEs belonging to the target delivery group for the purpose of checking whether the group message will be transmitted.

Overview of Devices to which the Present Invention May be Applied

FIG. 23 illustrates a block diagram of a communication device according to an embodiment of the present invention.

Referring to FIG. 23, a wireless communication system includes a network node 2310 and a plurality of UEs 2320.

The network node 2310 includes a processor 2311, a memory 2312, and a communication module 2313. The processor 2311 implements the functions, the procedures and/or the methods proposed through FIG. 1 to FIG. 22. The processor 2311 may implement layers of wired/wireless interface protocol. The memory 2312, being connected to the processor 2311, stores various types of information for driving the processor 2311. The communication module 2313, being connected to the processor 2311, transmits and/or receives wired/wireless signals. Examples of the network node 2310 include an eNB, an MME, an HSS, an SGW, a PGW, an application Server and so on. In particular, in the case, the network node 2310 is an eNB, the communication module 2313 may include a radio frequency (RF) unit for transmitting/receiving a radio signal.

The UE 2320 includes a processor 2321, a memory 2322, and a communication module (or RF unit) 2323. The processor 2321 implements the functions, the procedures and/or the methods proposed through FIG. 1 to FIG. 21. The processor 2321 may implement layers of wired/wireless interface protocol. The memory 2322, being connected to the processor 2321, stores various types of information for driving the processor 2321. The communication module 2323, being connected to the processor 2321, transmits and/or receives wired/wireless signals.

The memories 2312 and 2322 may be installed inside or outside the processors 2311 and 2321, and may be connected to the processors 2311, 2321 through various well-known means. In addition, the network node 2310 (in the case of an eNB) and/or the UE 2320 may have a single antenna or multiple antennas.

FIG. 24 illustrates a block diagram of a communication device according to an embodiment of the present invention.

Particularly, FIG. 24 is a diagram illustrating the UE of FIG. 23 above in more detail.

Referring to FIG. 24, the UE includes a processor (or a Digital Signal Processor (DSP)) 2410, an RF module (or RF unit) 2435, a power management module 2405, an antenna 2440, a battery 2455, a display 2415, a keypad 2420, a memory 2430, a Subscriber identification Module (SIM) card 2425 (this component is optional), a speaker 2445, and a microphone 2450. In addition, the UE may have a single antenna or multiple antennas.

The processor 2410 implements proposed functions, processes and/or methods proposed through FIG. 1 to FIG. 22. The processor 2410 may implement layers of a wireless interface protocol.

The memory 2430 is connected to the processor 2410, and stores the information in relation to the operation of the processor 2410. The memory 2430 may be installed inside or outside the processor 2410 and may be connected to the processor 2410 through various well-known means.

The user enters command information such as a phone number, for example, by pressing (or touching) buttons of the keypad 2420 or by voice activation on the microphone 2450. The processor 2410 receives the command information and performs an appropriate function such as dialing. The operational data may be extracted from the SIM card 2425 or the memory 2430. In addition, the processor 2410 may display the command information and the operation information on the display 2415, for the user reference and convenience.

An RF module 2435 transmits and receives an RF signal, being connected to the processor 2410. In order to initiate a communication, for example, the processor 2410 forwards command information to transmit a radio signal that constructs voice communication data to the RF module 2435. The RF module 2435 includes a receiver and a transmitter in order to receive and transmit a radio signal. An antenna 2440 functions to transmit and receive a radio signal. When receiving a radio signal, the RF module 2435 may forward a signal in order for a signal to be processed by the processor 2410, and may transform the signal in a baseband. The processed signal may be transformed to be audible or readable information outputted through the speaker 2445.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

MODE FOR INVENTION

All of the embodiments of the present invention have been described in the best mode for carrying out the invention.

INDUSTRIAL APPLICABILITY

The method for reporting the number of UEs existed in a geographical area and for supporting the same in a wireless communication system of the present invention has been described mainly with the example applied to 3GPP LTE/LTE-A system, but may also be applied to various wireless communication systems except the 3GPP LTE/LTE-A system.

The invention claimed is:

1. A method of transmitting, by a first mobility management entity (MME), a group message to a group to which a plurality of user equipments (UEs) belongs in a wireless communication system, the method comprising:
receiving a group message request message requesting a transmission of a group message,
wherein the group message request message comprises a group identifier (ID) of the group by which the group message is to be received, delivery content to be transmitted to the group and a validity time buffering the delivery content;
detecting a first UE connected to the first MME within the validity time;
checking whether a group ID of the detected first UE is identical to the group ID of the group message request message; and
transmitting the delivery content to the first UE if the checked group IDs are identical,
wherein the group message request message further comprises an immediate delivery parameter indicating whether the group message is to be immediately delivered, and
wherein the immediate delivery parameter is set to a value indicating that the group message is not to be immediately delivered.

2. The method of claim 1, wherein the delivery content is transmitted in a control plane through a non-access stratum (NAS) protocol data unit (PDU).

3. The method of claim 1, wherein the group message request message selectively comprises an international mobile subscriber identity (IMSI) of the plurality of UEs belonging to the group.

4. The method of claim 3, further comprising:
marking whether the delivery content has been successfully received for each UE using the IMSI of the plurality of UEs if the IMSI of the plurality of UEs is included in the group message request message.

5. The method of claim 1, wherein the detecting the first UE connected to the first MME comprises detecting the first UE connected to the first MME according to a tracking area update (TAU) procedure or a mobile originated call procedure of the first UE.

6. The method of claim 5, wherein, if the first UE performs a periodic TAU procedure, the validity time is set identically to a periodic TAU time.

7. The method of claim 1, further comprising:
receiving a context request message requesting mobility management (MM) context of a second UE from a second MME within the validity time,
wherein the context request message comprises a globally unique temporary identity (GUTI) of the second UE;
checking a group ID of the second UE using the GUTI;
checking whether the group ID of the second UE is identical to the group ID of the group message request message; and
transmitting a context response message comprising the delivery content and the MM context of the second UE to the second MME if the checked IDs are identical.

8. The method of claim 7, wherein the checking the group ID of the second UE using the GUTI comprises checking the group ID corresponding to a GUTI within the MM context of the second UE.

9. A method of transmitting, by a first mobility management entity (MME), a group message to a group to which a plurality of user equipments (UEs) belongs in a wireless communication system, the method comprising:
receiving a group message request message requesting a transmission of a group message,
wherein the group message request message comprises a group identifier (ID) of the group by which the group message is to be received, delivery content to be transmitted to the group and an international mobile subscriber identity (IMSI) of the plurality of UEs belonging to the group;
transmitting a paging message to the plurality of UEs having the IMSI; and
transmitting the delivery content to at least one UE of the plurality of UEs if the at least one UE is connected,
wherein the group message request message further comprises an immediate delivery parameter indicating whether the group message is to be immediately delivered, and
wherein the immediate delivery parameter is set to a value indicating the immediate delivery of the group message.

10. The method of claim 9, wherein the delivery content is transmitted in a control plane through a non-access stratum (NAS) protocol data unit (PDU).

11. The method of claim 9, wherein at least one UE of the plurality of UEs corresponds to a UE to which discontinuous reception (DRX) or extended DRX (eDRX) is applied.

12. The method of claim 9, further comprising:
marking whether the delivery content has been successfully received for each UE using the IMSI of the plurality of UEs.

13. The method of claim 9, wherein if the least one UE of the plurality of UEs is connected, a service request message which is an initial non-access stratum (NAS) message is received from the at least one UE as a response to the paging message.

14. A first mobility management entity (MME) for transmitting a group message to a group to which a plurality of user equipments (UEs) belongs in a wireless communication system, the first MME comprising:
a transmitter;
a receiver; and
a processor,
wherein the processor is configured to:
control the receiver to receive a group message request message requesting a transmission of a group message,
wherein the group message request message comprises a group identifier (ID) of the group by which the group message is to be received, delivery content to be transmitted to the group and a validity time buffering the delivery content;
detect a first UE connected to the first MME within the validity time;
check whether a group ID of the detected first UE is identical to the group ID of the group message request message; and
control the transmitter to transmit the delivery content to the first UE if the checked group IDs are identical,
wherein the group message request message further comprises an immediate delivery parameter indicating whether the group message is to be immediately delivered, and
wherein the immediate delivery parameter is set to a value indicating that the group message is not to be immediately delivered.

* * * * *